US011204428B2

(12) United States Patent
Meifang et al.

(10) Patent No.: US 11,204,428 B2
(45) Date of Patent: *Dec. 21, 2021

(54) COMMUNICATION FOR HIGH ACCURACY COOPERATIVE POSITIONING SOLUTIONS

(71) Applicant: VEONEER US INC., Southfield, MI (US)

(72) Inventors: Zhu Meifang, Lund (SE); Olof Eriksson, Älvsjö (SE); Tobias Aderum, Gothenburg (SE)

(73) Assignee: VEONEER US INC., Southfield, MI (US)

( * ) Notice: Subject to any disclaimer, the term of this patent is extended or adjusted under 35 U.S.C. 154(b) by 175 days.

This patent is subject to a terminal disclaimer.

(21) Appl. No.: 16/569,723

(22) Filed: Sep. 13, 2019

(65) Prior Publication Data
US 2020/0019176 A1  Jan. 16, 2020

Related U.S. Application Data

(63) Continuation of application No. PCT/US2018/018163, filed on Feb. 14, 2018.

(30) Foreign Application Priority Data

Mar. 17, 2017 (EP) .................................. 17161659

(51) Int. Cl.
*G01S 19/51* (2010.01)
*H04W 4/46* (2018.01)
(Continued)

(52) U.S. Cl.
CPC .............. *G01S 19/51* (2013.01); *B60R 21/01* (2013.01); *B60R 21/0134* (2013.01);
(Continued)

(58) Field of Classification Search
CPC .................................. G01S 19/51; H04W 4/46
See application file for complete search history.

(56) References Cited

U.S. PATENT DOCUMENTS 9,651,655 B2 * 5/2017 Feldman ................. G01S 19/51
2002/0198632 A1  12/2002 Breed et al. ...................... 701/1
(Continued)

FOREIGN PATENT DOCUMENTS

WO   WO 2016148810 A1 * 9/2016 ........ H04W 28/0284

OTHER PUBLICATIONS

Weon et al., "Position and Vision Information of Relative Vehicle's Using Procrustes Analysis Method for Position Correction", 2016, International Journal of Future Generation Communication and Networking, vol. 9 No. 10, pp. 51-62. (Year: 2016).*

(Continued)

*Primary Examiner* — Peter D Nolan
*Assistant Examiner* — Kenneth M Dunne
(74) *Attorney, Agent, or Firm* — Christopher P. Maiorana, PC

(57) ABSTRACT

An apparatus comprising a transceiver, a processor and a memory. The transceiver may be configured to send/receive data messages to/from a plurality of vehicles. The processor may be configured to execute instructions. The memory may be configured to store instructions that, when executed, perform the steps of (A) generating signal distance calculations between the apparatus and at least three of the vehicles using the data messages, (B) calculating a plurality of potential positions of the vehicles using the signal distance calculations, (C) performing a scaling operation on the plurality potential positions of the vehicles to determine relative positions of the vehicles on a coordinate system, (D) implementing a procrusting procedure on the coordinate system to generate a corrected coordinate system and (F)

(Continued)

determining changes of the relative positions using the corrected coordinate system.

19 Claims, 14 Drawing Sheets

(51) Int. Cl.
| | |
|---|---|
| *G01S 19/48* | (2010.01) |
| *G01S 5/00* | (2006.01) |
| *G01S 5/02* | (2010.01) |
| *H04W 56/00* | (2009.01) |
| *G01S 19/39* | (2010.01) |
| *G08G 1/01* | (2006.01) |
| *G01S 13/87* | (2006.01) |
| *B60W 30/095* | (2012.01) |
| *G08G 1/16* | (2006.01) |
| *H04L 12/26* | (2006.01) |
| *B60R 21/01* | (2006.01) |
| *B60R 21/0134* | (2006.01) |
| *B60R 21/231* | (2011.01) |
| *B60R 21/36* | (2011.01) |
| *B60R 22/48* | (2006.01) |
| *G05D 1/00* | (2006.01) |
| *G05D 1/02* | (2020.01) |
| *G08G 1/00* | (2006.01) |

(52) U.S. Cl.
CPC ........ *B60R 21/23138* (2013.01); *B60R 21/36* (2013.01); *B60R 22/48* (2013.01); *B60W 30/0953* (2013.01); *G01S 5/0072* (2013.01); *G01S 5/0289* (2013.01); *G01S 13/878* (2013.01); *G01S 19/396* (2019.08); *G01S 19/48* (2013.01); *G05D 1/0022* (2013.01); *G05D 1/0027* (2013.01); *G05D 1/0214* (2013.01); *G05D 1/0217* (2013.01); *G05D 1/0295* (2013.01); *G08G 1/0112* (2013.01); *G08G 1/0133* (2013.01); *G08G 1/161* (2013.01); *G08G 1/164* (2013.01); *G08G 1/166* (2013.01); *G08G 1/22* (2013.01); *H04L 43/0864* (2013.01); *H04W 4/46* (2018.02); *H04W 56/006* (2013.01); *H04W 56/0065* (2013.01); *B60R 2021/01088* (2013.01); *B60R 2021/01231* (2013.01); *B60R 2021/01272* (2013.01); *B60W 2554/80* (2020.02); *B60W 2556/65* (2020.02); *G01S 2205/002* (2013.01)

(56) References Cited

U.S. PATENT DOCUMENTS

| | | | |
|---|---|---|---|
| 2010/0256835 A1 | 10/2010 | Mudalige | 701/2 |
| 2011/0037647 A1* | 2/2011 | Tajima | G01S 19/20 342/357.26 |
| 2011/0238306 A1 | 9/2011 | Miucic | |
| 2013/0261947 A1 | 10/2013 | Yamashiro | |
| 2013/0278440 A1 | 10/2013 | Rubin et al. | 340/903 |
| 2015/0077270 A1 | 3/2015 | Rubin et al. | 340/903 |
| 2015/0262487 A1 | 9/2015 | Cazanas | |
| 2016/0205656 A1* | 7/2016 | Zeng | G01S 19/51 455/456.1 |
| 2016/0260328 A1 | 9/2016 | Mishra et al. | |
| 2016/0341557 A1 | 11/2016 | Kondo | |
| 2018/0035255 A1* | 2/2018 | Kordybach | H04W 4/46 |
| 2018/0114441 A1* | 4/2018 | Marmet | G01S 19/48 |
| 2018/0129890 A1* | 5/2018 | Mielenz | G05D 1/0088 |
| 2020/0191978 A1* | 6/2020 | Stahlin | G01S 19/43 |
| 2021/0263165 A1* | 8/2021 | Zheng | G01S 19/243 |

OTHER PUBLICATIONS

Bastani, Precise Realtime Localization by RF Transceiver ToF Measurements, International Conference on Advanced Robotics, Jun. 22, 2009, 1-6.

* cited by examiner

US 11,204,428 B2

COMMUNICATION FOR HIGH ACCURACY COOPERATIVE POSITIONING SOLUTIONS

This application relates to International Application PCT/US2018/018163, with an International Filing Date of Feb. 14, 2018, which claims the benefit of EP Application No. EP17161659.2, filed Mar. 17, 2017, each of which is incorporated by reference in its entirety.

FIELD OF THE INVENTION

The present invention relates to object positioning generally and, more particularly, to communication for high accuracy cooperative positioning solutions.

BACKGROUND OF THE INVENTION

Positioning of objects (i.e., vehicles, buildings, pedestrians, etc.) can be determined using GPS (Global Positioning System) or GNSS (Global Navigation Satellite System). Some applications that use positioning, such as assisted driving, need high precision data to be implemented safely. To calculate high precision data with GPS/GNSS, real-time kinematics (RTK) with base-stations are used, which is currently not viable for commercial use. Host vehicle gyros can also be used to estimate a future expected trajectory of objects, but if the initial GPS/GNSS position is incorrect the problem cannot be solved correctly.

In assisted driving applications, such as active intervention, knowledge of the positions of surrounding vehicles with high accuracy is utilized, which is currently implemented using many different sensors covering 360 degrees around a vehicle. There are many vehicle environment detection systems, such as camera systems, Doppler radar systems and LIDAR systems. Inaccuracies can lead to both false-positives and false-negatives. GPS/GNSS does not provide a sufficient degree of accuracy, especially in urban conditions.

Using periodic broadcasts to perform inter-vehicle range estimation can be used to obtain a high degree of accuracy regarding relative positioning between objects. Determining highly accurate relative positioning between objects introduces additional issues. One such issue is that conventional protocols for communicating between vehicles do not provide suitable information for performing efficient, high accuracy relative position calculations.

It would be desirable to implement communication for high accuracy cooperative positioning solutions.

SUMMARY OF THE INVENTION

The present invention concerns an apparatus comprising a transceiver, a processor and a memory. The transceiver may be configured to send/receive data messages to/from a plurality of vehicles. The processor may be configured to execute instructions. The memory may be configured to store instructions that, when executed, perform the steps of (A) generating signal distance calculations between the apparatus and at least three of the vehicles using the data messages, (B) calculating a plurality of potential positions of the vehicles using the signal distance calculations, (C) performing a scaling operation on the plurality potential positions of the vehicles to determine relative positions of the vehicles on a coordinate system, (D) implementing a procrusting procedure on the coordinate system to generate a corrected coordinate system and (F) determining changes of the relative positions using the corrected coordinate system.

BRIEF DESCRIPTION OF THE DRAWINGS

Embodiments of the invention will be apparent from the following detailed description and the appended claims and drawings in which:

DETAILED DESCRIPTION OF THE PREFERRED EMBODIMENTS

Embodiments of the present invention include providing communication for high accuracy cooperative positioning solutions that may (i) determine a value of a range between vehicles, (ii) determine an absolute distance between vehicles, (iii) be compatible with a basic safety message protocol, (iv) implement multi-dimensional scaling, (v) implement a procrusting procedure, (vi) communicate time stamped signals between vehicles, (vii) enable efficient calculation of a cooperative positioning solution and/or (viii) be easy to implement.

Grouping and/or clustering may be used in telecommunication. Additionally, grouping and/or clustering may be implemented in the area of cooperative positioning, which is described in, "Improving Cooperative Positioning for Vehicular Networks", IEEE Transactions of Vehicular Technology, Vol 60, no. 6 Jul. 2011. In an example, grouping may be performed by approximate position and/or vehicle kinetics. A propagation delay of a wireless signal from a transmitter to a receiver may be used to estimate a distance. In one example, a round-trip time (RTT) (e.g., a round-trip delay time) may be used for estimating a distance accurately by sending a wireless signal between vehicles and/or objects (e.g., one at a time). Using periodic broadcasts is described in the paper "Inter-vehicle range estimation from periodic broadcasts" by Urs Niesen, Venkatesan N. Ekambaram, Jubin Jose, and Xinzhou Wu. In order to establish initial positions from the measured ranges, Multi-Dimensional Scaling (MDS) may be used. MDS is described in the paper "Joint relative position and velocity estimation for an anchorless network of mobile nodes" by Raj Thilak Rajan, Geert Leus, and Alle-Jan van der Veen.

Figure 1:
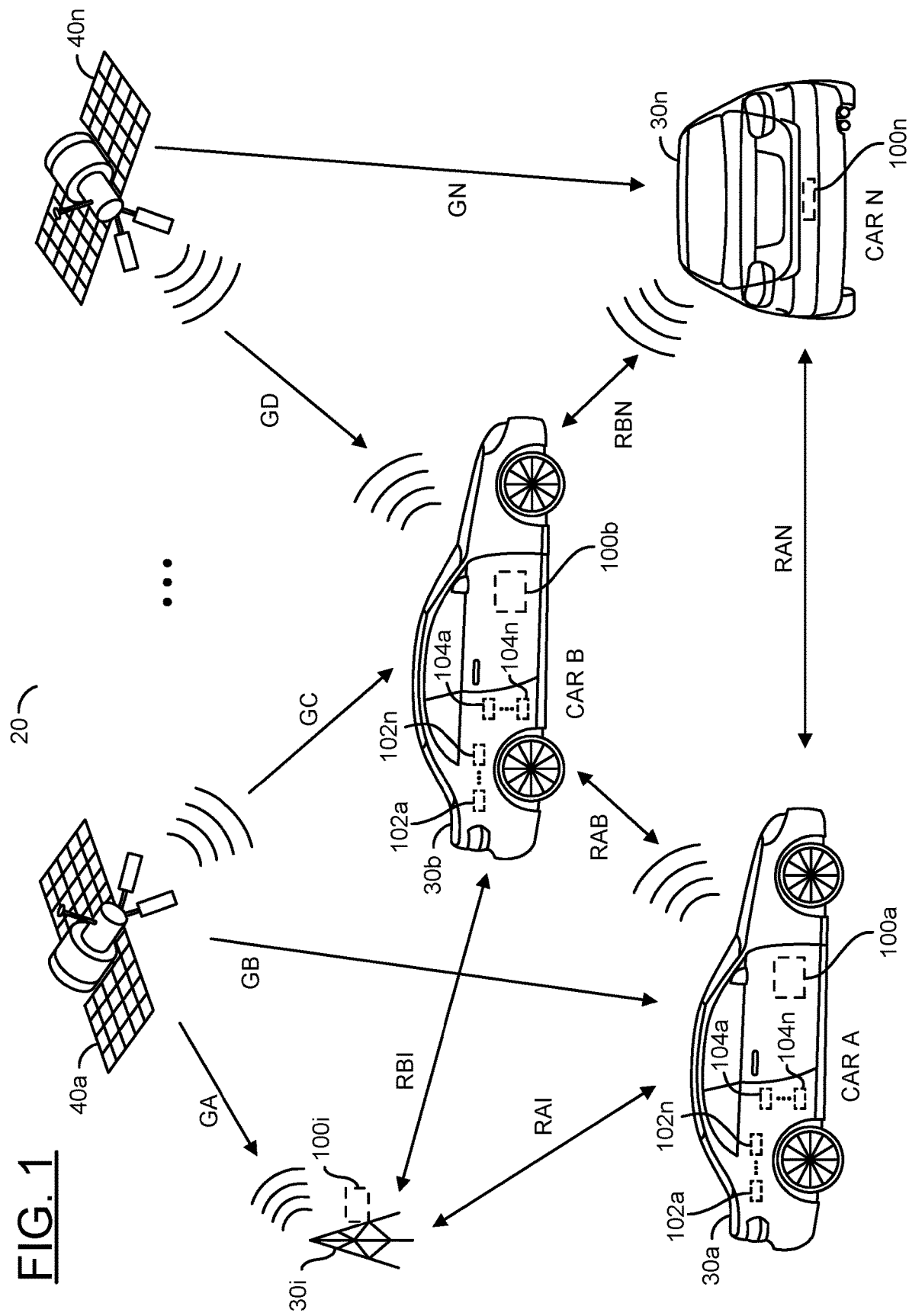
FIG. 1 is a diagram illustrating an embodiment of the present invention.

Referring to FIG. 1, a diagram illustrating an embodiment of the present invention is shown. An example system 20 is shown. The system 20 may comprise a number of objects 30a-30n and/or a number of communication satellites 40a-40n. In the example shown, the objects may comprise a combination of vehicles and/or base stations (e.g., infrastructure). In the example shown, two of the communication satellites 40a-40n are shown as a representation of a Global Positioning System (GPS) and/or Global Navigation Satellite System (GNSS) located around the world. In the example shown, the objects 30a, 30b and/or 30n may be vehicles and the object 30i may be a base station. In some embodiments, each of the objects 30a-30n may be a vehicle (e.g., no base stations). The number of vehicles and/or base stations 30a-30n and/or communication satellites 40a-40n may be varied according to the design criteria of a particular implementation. The system 20 may be configured to adjust and/or self-correct for various numbers of the vehicles and/or base stations 30a-30n and/or communication satellites 40a-40n.

Each of the objects 30a-30n may comprise a respective apparatus (or circuit or module) 100a-100n. The modules 100a-100n may be described in more detail in connection with FIG. 2. The modules 100a-100n may be implemented within and/or attached to the objects 30a-30n. In the example shown, the module 100a is shown within the vehicle 30a and the module 100i is attached to the base station 30i. For example, the modules 100a-100n may be located within a dashboard and/or with other electronics of the vehicles 30a-30n. In some embodiments, the modules 100a-100n may be implemented in a mobile device (e.g., a cell phone, tablet computing device, a computer, a stand-alone GPS device, a fitness monitoring device, a smartwatch, etc.). In an example, the mobile device implementing the modules 100a-100n may be operated within a vehicle that is moving. The location of and/or how the modules 100a-100n are connected to the objects 30a-30n may be varied according to the design criteria of a particular implementation.

In the example shown, the objects 30a-30n and/or the respective modules 100a-100n may be configured to communicate with the communication satellites 40a-40n. Generally, four or more of the communication satellites 40a-40n may be connected (e.g., via wireless communication signals). In another example, the connection to the satellites 40a-40n may be implemented through a GPS-type connection. The satellites 40a-40n may present signals (e.g., GA-GN). An example implementation uses a Global Navigation Satellite System (GNSS) or Global Positioning System (GPS). Location information (e.g., coordinates) may be calculated (e.g., by the modules 100a-100n and/or other components of the objects 30a-30n) from the signals GA-GN received from GNSS or GPS. The positional accuracy of the location information may be determined by the modules 100a-100n.

In some embodiments, the modules 100a-100n may be configured to receive the signals GA-GN sent by the satellites 40a-40n. The modules 100a-100n may be configured to calculate the location information (e.g., position data, coordinates, etc.) of the respective vehicles 30a-30n based on the data in the signals GA-GN. In some embodiments, the objects 30a-30n (e.g., a GPS module) may present the calculated location data to the modules 100a-100n. In some embodiments, (e.g., clear sky conditions with limited and/or no interference and/or multipath errors), the positional accuracy of the location information calculated from the signals GA-GN may be within an acceptable tolerance to provide one independently calculated source of positional data.

Local conditions may be any type of interference and/or multipath factor that may affect a determination of location information (e.g., position coordinates) using the signals GA-GN. For example, the local conditions may be due to ionospheric interference, noise, signal degradation caused by dense urban areas, signal degradation caused by tall buildings, etc. The modules 100a-100n may be configured to supplement and/or enhance the accuracy of the location data of the objects 30a-30n determined from the signals GA-GN by using cooperative positioning. For example, the modules 100a-100n may be configured to provide location data that is more accurate than location data calculated using the signals GA-GN.

In some embodiments, infrastructure (e.g., the base station 30i, in the example shown) may be implemented as a fixed base station, such as a cellular tower, a user installed fixed base station, and/or another type of fixed base station. While only the base station 30i is shown, generally more than one of the base stations 30i may be implemented to provide signals used to calculate the location information. In some embodiments, since the base station 30i may be at a known and fixed location, the base station 30i may be connected to the satellites 40a-40n, calculate location information from the signals GA-GN and provide a verification of the signals GA-GN compared to the known and fixed location of the base station 30i.

In one example, the modules 100a-100n are shown located in the vehicles 30a-30n. The modules 100a-100n may be implemented as a single unit (e.g., an installed device and/or module) and/or a distributed unit. For example, various components of the modules 100a-100n may be implemented at various locations in and/or on the vehicles 30a-30n and connected by an electronic network connecting one or more of the components and enabling a sharing of information in the form of digital signals (e.g., a serial bus, an electronic bus connected by wiring and/or interfaces, a wireless interface, etc.). In some embodiments, the modules 100a-100n may be implemented in an infotainment module of the vehicles 30a-30n.

The vehicles 30a-30n may each comprise a number of blocks (or circuits) 102a-102n and/or blocks (or circuits) 104a-104n. The circuits 102a-102n may be configured to implement sensors. The circuits 104a-104n may be configured to implement actuators. The sensors 102a-102n and/or the actuators 104a-104n may be connected through an electronic bus (to be described in association with FIG. 2) and/or a wireless connection. In some embodiments, the sensors 102a-102n and/or the actuators 104a-104n may be configured to communicate with the modules 100a-100n. The sensors 102a-102n may be configured to capture information from the environment near the vehicles 30a-30n. The actuators 104a-104n may be configured to cause the vehicles 30a-30n and/or components of the vehicles 30a-30n to perform an action. In some embodiments, the sensors 102a-102n and/or the actuators 104a-104n may be configured to read data to detect objects and/or perform actions in response to the detected objects to cause the vehicles 30a-30n to implement functions such as speed control, collision prediction, collision prevention, automatic alignment, online bumper fascia calibration, motion estimation, dead reckoning, Intersection Movement Assist (IMA), Left Turn Assist (LTA), Forward Collision Warning (FCW), Lane Change Warning (LCW) and/or scene understanding.

The modules 100a-100n may be configured to communicate signals (e.g., RAA-RNN). The signals RAA-RNN may be communicated between the modules 100a-100n to determine a relative distance between the objects 30a-30n. Generally, each of the modules 100a-100n may transmit one of the signals RAA-RNN to each of the modules 100a-100n (e.g., within a particular range). In the example shown, the module 100a may transmit the signal RAB to the module 100b, the signal RAI to the module 100i and the signal RAN to the module 100n. Similarly, in the example shown, the module 100b may transmit the signal RAB to the module 100a, the signal RBI to the module 100i and the signal RBN to the module 100n. The number of the signals RAA-RNN may be varied according to the design criteria of a particular implementation.

The signals RAA-RNN may be used by the modules 100a-100n to calculate a value of the range between the objects 30a-30n. In an example, the signals RAA-RNN may be configured similarly to a radar to measure the amount of time a transmitted signals takes to be sent to a destination and/or return from a destination. For example, the module 100a may perform ranging (e.g., determine the absolute distance between the objects 30a and 30b) by transmitting the signal RAB to the module 100b and measuring how long before the signal RAB returns to the module 100a (e.g., a round-trip time). The communication used to transmit the signal RAA-RNN may be implemented through a cellular network connection (e.g., 3G, 4G, 5G LTE, etc.), a Wi-Fi connection, a GPS-type connection, a radio signal, an ultrasonic signal and/or another type of wireless connection. In one example, the signals RAA-RNN may be implemented on a particular wireless frequency spectrum (e.g., 5.9 GHz Dedicated Short Range Communication spectrum). In another example, the signals RAA-RNN may be implemented as and/or alongside a Basic Safety Message (BSM). In yet another example, Wi-Fi may be implementing and the signals RAA-RNN may be part of a lower layer protocol configured to transmit time stamps (e.g., MAC and/or PHY). The signals RAA-RNN may be used to implement vehicle-to-vehicle (e.g., V2V) and/or vehicle-to-infrastructure (e.g., V2I) communication (e.g., V2X communication). The type of wireless connection used to communicate between the modules 100a-100n may be varied according to the design criteria of a particular implementation.

The relative positioning values (e.g., coordinates) calculated by the modules 100a-100n using the signals RAA-RNN may be configured to enable an implementation of cooperative positioning. The cooperative positioning and/or relative coordinates determined by the modules 100a-100n may have a greater accuracy than the location information determined using the signals GA-GN (e.g., using GNSS data). The cooperative positioning information may be fused with data acquired using the sensors 102a-102n and/or data generated using the signals GA-GN. The higher accuracy and/or precision of the relative position between the objects 30a-30n may reduce uncertainty, reduce a number of false positives, reduce erroneous data calculations and/or enable an improved Automotive Safety Integrity Level (ASIL) classification. For example, in urban scenarios with poor GNSS coverage, there may be GPS uncertainty and relying on GPS information may generate a large number of false positives and/or false negatives. The cooperative positioning may be used together with map information to provide improved navigation information.

The modules 100a-100n may be configured to enable sensor and/or data fusion. For example, the modules 100a-100n may be configured to receive data from one or more (e.g., disparate) sources (e.g., the signals GA-GN, the signals RAA-RNN, the sensors 102a-102n, etc.). The modules 100a-100n may combine and/or analyze the data from the different sources to make inferences about the environment surrounding the objects 30a-30n. The inferences made by the module 100a-100n may provide a greater accuracy and/or precision of data (e.g., relative positioning) than using one of the sources of data alone.

Figure 2:
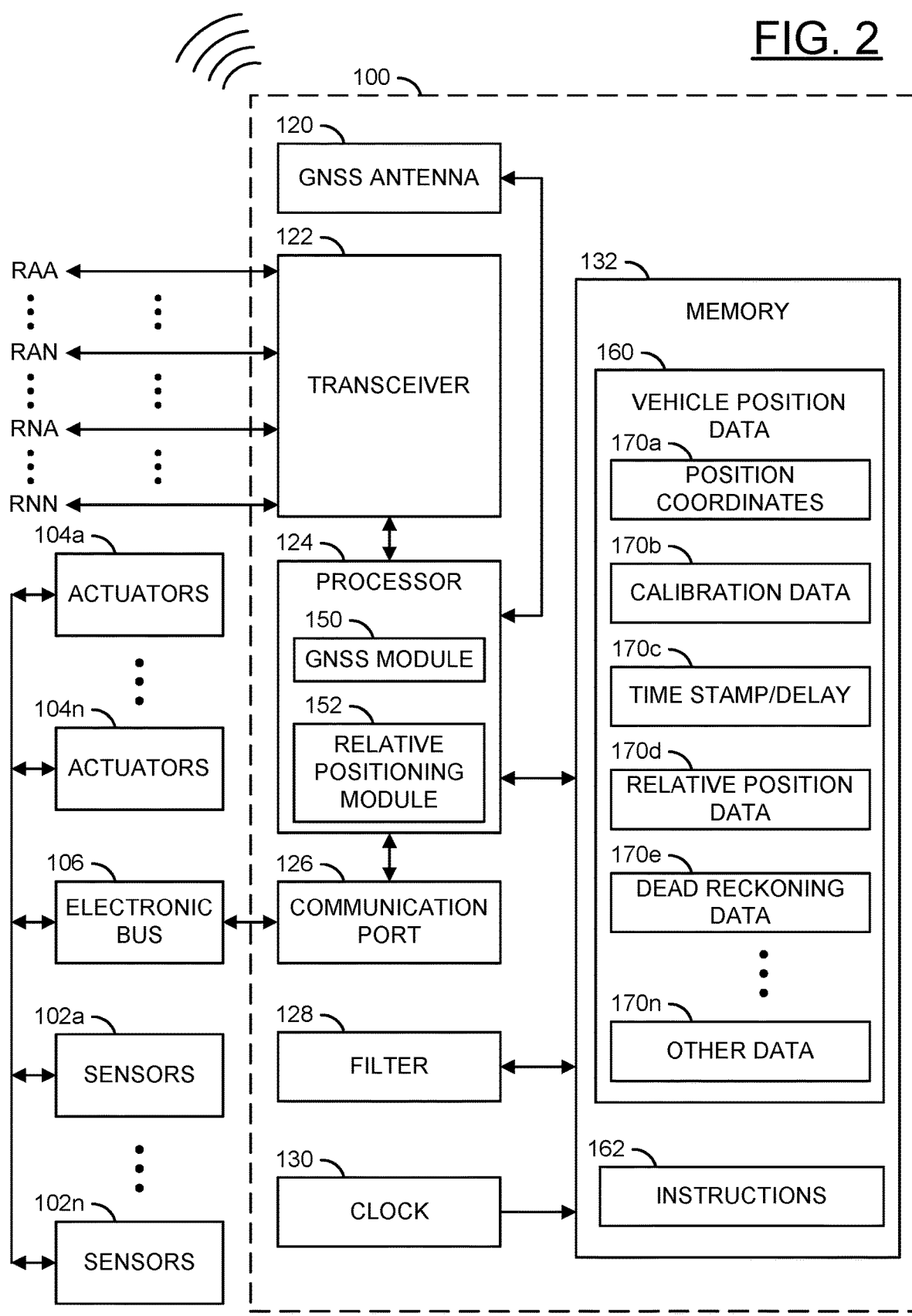
FIG. 2 is a diagram illustrating a module configured to determine high-precision range estimation.

Referring to FIG. 2, a diagram illustrating an example one of the modules 100a-100n configured to determine high-precision range estimation is shown. The module 100 is shown as a representative example of one of the modules 100a-100n. The module 100 may be configured to generate and/or calculate a position relative to other vehicles. The module 100 is shown transmitting/receiving the signals RAA-RNN. The module may send/receive other signals (not shown). For example, the module 100 may receive one or more of the signals GA-GN. The number and/or type of signals sent and/or received by the module 100 may be varied according to the design criteria of a particular implementation.

The module 100 may be connected to a block (or circuit) 106. The circuit 106 may implement an electronic bus. The electronic bus 106 may be configured to transfer data between the module 100 and the sensors 102a-102n and/or the actuators 104a-104n. In some embodiments, the electronic bus 106 may be implemented as a vehicle CAN bus. The electronic bus 106 may be implemented as an electronic wired network and/or a wireless network. Generally, the electronic bus 106 may connect one or more components of the vehicle 30 to enable a sharing of information in the form of digital signals (e.g., a serial bus, an electronic bus connected by wiring and/or interfaces, a wireless interface, etc.).

The module 100 generally comprises a block (or circuit) 120, a block (or circuit) 122, a block (or circuit) 124, a block (or circuit) 126, a block (or circuit) 128, a block (or circuit) 130 and/or a block (or circuit) 132. The circuit 120 may implement a GNSS antenna. The circuit 122 may implement a transceiver. The circuit 124 may implement a processor. The circuit 126 may implement a communication port. The circuit 128 may implement a filter. The circuit 130 may implement a clock. The circuit 132 may implement a memory. Other blocks (not shown) may be implemented (e.g., I/O ports, power connectors, interfaces, etc.). The number and/or types of circuits implemented by the module 100 may be varied according to the design criteria of a particular implementation.

The antenna 120 may be implemented as a dual band antenna capable of connecting to both a cellular network (e.g., to provide a potential connection option to the base stations 30i) and/or a GNSS network (e.g., the communication satellites 40a-40n). In another example, the antenna 120 may be implemented as two antennas. For example, one antenna may be specifically designed to connect to the base station(s) (e.g., 30i), while another antenna may be implemented to connect to the GNSS network satellites 40a-40n. The antenna 120 may be implemented as discrete antenna modules and/or a dual band antenna module. In some embodiments, the antenna 120 may be implemented as an off-board circuit (e.g., a component that is not part of the module 100). For example, the antenna 120 may send/receive data to/from the module 100 via the electronic bus 106. The implementation of the antenna 120 may be varied according to the design criteria of a particular implementation.

The transceiver 122 may be configured to communicate (e.g., send and/or receive) data (e.g., radio signals). The transceiver 122 may be configured to generate and/or receive one or more of the signals RAA-RNN. The transceiver 122 may receive data from the processor 124 to communicate with external devices (e.g., other of the modules 100a-100n). The transceiver 122 may receive communications from external devices (e.g., other of the modules 100a-100n) and transmit the communication signals to the processor 124. The transceiver 122 may be configured to communicate a Basic Safety Message (BSM) protocol and/or data outside the BSM protocol. In some embodiments, the transceiver 122 may send and/or receive the signals RAA-RNN through the communication port 126 and/or the sensors 102a-102n. The transceiver 122 may be configured to be compatible with one or more communications protocols (e.g., a Wi-Fi transceiver configured to perform dedicated short-range communication (DSRC), vehicle to vehicle (V2V) and/or vehicle to infrastructure (V2I) communication). The implementation of the transceiver 122 may be varied according to the design criteria of a particular implementation.

The processor 124 may be implemented as a microcontroller. The processor 124 may comprise a block (or circuit) 150 and/or a block (or circuit) 152. The circuit 150 may implement a GNSS module and/or chipset. The circuit 152 may implement a relative positioning module. The processor 124 may comprise other components (not shown). In some embodiments, the processor 124 may be a combined (e.g., integrated) chipset implementing processing functionality, the relative positioning chipset 152 and/or the GNSS chipset 150. In some embodiments, the processor 124 may be comprised of a number of separate circuits (e.g., the microcontroller, the GNSS chipset 150 and/or the relative positioning chipset 152). The GNSS module 150 and/or the relative positioning module 152 may each be an optional component of the processor 124. In an example, an off-board circuit (e.g., a component that is not part of the module 100) may perform the functions of the GNSS chipset 150 and send information to the module 100 (e.g., via the bus 106). In another example, an off-board circuit (e.g., a component that is not part of the module 100 such as a distributed and/or scalable computing service) may perform functions for determining the cooperative positioning data and send information to the module 100 (e.g., via the bus 106). The design of the processor 124 and/or the functionality of various components of the processor 124 may be varied according to the design criteria of a particular implementation. The processor 124 is shown sending data to and/or receiving data from the antenna 120, the transceiver 122, the memory 132 and/or the communication port 126.

The memory 132 may comprise a block (or circuit) 160 and a block (or circuit) 162. The block 160 may store vehicle position data. The block 162 may store computer readable instructions (e.g., instructions readable by the processor 124). The vehicle position data 160 may store various data sets 170a-170n. For example, the data sets 170a-170n may comprise position coordinates 170a, calibration data 170b, a time stamp/delay 170c, relative position data 170d, dead reckoning data 170e and/or other data 170n.

The position coordinates 170a may store location information data calculated and/or received by the module 100 from the signals GA-GN presented by the GNSS satellites 40a-40n. The signals GA-GN may provide data from which a particular resolution of location information positional accuracy may be calculated. In some embodiments, the position coordinates 170a may not provide sufficient positional accuracy for particular applications (e.g., lane detection, autonomous driving, etc.). The relative position data 170d may be used to improve the accuracy of the position coordinates 170a. In some embodiments, the position coordinates 170a may be calculated by the filter 128 and/or a component external to the module 100. In some embodiments, the position coordinates 170a may be calculated by the GNSS module 150.

The calibration data 170b may comprise parameters (e.g., coefficients) used to transform data received from the sensors 102a-102n and/or presented to the actuators 104a-104n. The calibration data 170b may provide many sets of coefficients (e.g., one set of coefficients for each of the sensors 102a-102n and/or the actuators 104a-104n). The calibration data 170b may be updatable. For example, the calibration data 170b may store current values as coefficients for the sensors 102a-102n and/or the actuators 104a-104n and as the data from the sensors 102a-102n and/or the actuators 104a-104n drifts the module 100 may update the calibration data 170b in order to maintain accuracy. The format of the calibration data 170b may vary based on the design criteria of a particular implementation.

The time stamp/delay 170c may be used to determine an age of the vehicle position data 160, the time of flight of the signals RAA-RNN and/or the round-trip time of the signals RAA-RNN. In one example, the time stamp 170c may be used to determine if the vehicle position data 160 should be considered reliable or unreliable (e.g., data older than a pre-determined threshold amount of time may be unreliable). In one example, the time stamp 170c may be appended to the signals RAA-RNN. For example, the time stamp 170c may record a time in Coordinated Universal Time (UTC) and/or in a local time. The implementation of the time stamp 170c may be varied according to the design criteria of a particular implementation.

The relative position data 170d may be used to augment (e.g., improve) a precision of the position coordinates 170a (e.g., the GNSS position) and/or provide an independent set of position data (e.g., cooperative position information). The relative position data 170d may comprise ranging data corresponding to the relative position of the vehicle 30 (e.g., the ego vehicle) to other vehicles. The relative position data 170d may represent a cooperative position solution (e.g., CoP). The relative position data 170d may be used to account (e.g., compensate) for the local conditions that may affect an accuracy of the position coordinates 170a. The relative position data 170d may provide higher precision location information than the position coordinates 170a. The relative position data 170d may be calculated by the relative positioning module 152.

The dead reckoning data 170e may be used to store past and/or present information to determine positions traveled by the vehicle 30. For example, the dead reckoning data 170e may store a previously determined position of the vehicle 30 (e.g., estimated speed, estimated time of travel, estimated location, etc.). The previously determined position may be used to help determine a current position of the vehicle 30. In some embodiments, the dead reckoning data 170e may be determined based on data from the sensors 102a-102n of the vehicle 52 (e.g., an on-board gyroscope and/or wheel click messages). The implementation and/or the information stored to determine the dead reckoning data 170e may be varied according to the design criteria of a particular implementation.

Various other types of data (e.g., the other data 170n) may be stored as part of the vehicle position data 160. For example, the other data 170n may store trend information for the calibration data 170b. For example, the other data 170n may store past data values of the calibration data 170b and/or current data values of the calibration data 170b. The past and current data values of the calibration data 170b may be compared to determine trends used to extrapolate and/or predict potential future values for the calibration data 170b. For example, the trend information may be used to continue to refine the calibration data 170b when the module 100 is operating in a pure dead reckoning mode (e.g., the location information fails the quality check). In some embodiments, the other data 170n may store various coordinate systems determined using a procrusting procedure and/or multi-dimensional scaling operations.

The processor 124 may be configured to execute stored computer readable instructions (e.g., the instructions 162 stored in the memory 132). The processor 124 may perform one or more steps based on the stored instructions 162. In an example, the processor 124 may calculate the location information (e.g., based on the received signals GA-GN). In another example, one of the steps of the instructions 162 may be executed/performed by the processor 124 and may determine the relative position data 170d based on the signals RAA-RNN. The instructions executed and/or the order of the instructions 162 performed by the processor 124 may be varied according to the design criteria of a particular implementation.

The communication port 126 may allow the module 100 to communicate with external devices such as the sensors 102a-102n and/or the actuators 104a-104n. For example, the module 100 is shown connected to the external electronic bus 106. The communication port 126 may allow the module 100 to share the cooperative position data 170d with various infrastructure and/or components of the vehicle 30 (e.g., the sensors 102a-102n and/or the actuators 104a-104n). The communication port 126 may allow the module 100 to receive information from the sensors 102a-102n of the vehicle 30 (e.g., an on-board gyroscope data, wheel click messages, LIDAR, etc.). For example, information from the module 100 may be communicated to an infotainment device for display to a driver. In another example, a wireless connection (e.g., Wi-Fi, Bluetooth, cellular, etc.) to a portable computing device (e.g., a smartphone, a tablet computer, a notebook computer, a smart watch, etc.) may allow information from the module 100 to be displayed to a user.

The filter 128 may be configured to perform a linear quadratic estimation. For example, the filter 128 may implement a Kalman filter. Generally, the filter 128 may operate recursively on input data to produce a statistically optimal estimate. For example, the filter 128 may be used to calculate the position coordinates 170a and/or estimate the accuracy of the position coordinates 170a. In some embodiments, the filter 128 may be implemented as a separate module. In some embodiments, the filter 128 may be implemented as part of the memory 132 (e.g., the stored instructions 162). The implementation of the filter 128 may be varied according to the design criteria of a particular implementation.

The clock 130 may be configured to determine and/or track a time. The time determined by the clock 130 may be stored as the time stamp data 170c. In some embodiments, the clock 130 may be configured to compare time stamps received in the signals RAA-RNN to determine a delay (e.g., a round-trip time).

The module 100 may be configured to calculate a position and/or broadcast data (e.g., via the transceiver 122 and/or the communication port 126) such as the positional coordinates 170a, an age of the data (e.g., when the data was last updated such as the time stamp 170c), the relative position data 170d and/or other data 170n. A method of communication implemented by the transceiver 122 and/or the communication port 126 and/or the type of data transmitted may be varied according to the design criteria of a particular implementation.

The module 100 may be configured as a chipset, a system on chip (SoC) and/or a discrete device. For example, the module 100 may be implemented as an electronic control unit (ECU). In some embodiments, the module 100 may be configured to calculate a position, velocity and time (PVT) solution, a relative positioning solution and/or a dead reckoning solution. In some embodiments, the module 100 may transmit received data (e.g., the signals GA-GN and/or the signals RAA-RNN) to other components external to the module 100 to perform calculations (e.g., the relative position data 170d may be sent to another component to determine the cooperative positioning solution). For example, PVT may be considered a bare minimum output for navigation. In some embodiments, the module 100 may comprise the GNSS chipset 150 and calculate a PVT solution and/or the dead reckoning solution. In some embodiments, the module 100 may be configured to receive a data stream that provides the PVT solution and may not determine the dead reckoning solution (e.g., the module 100 receives PVT data from an off-board component, determines the calibration data 170b and sends the calibration data 170b to an off-board component to determine the dead reckoning solution). In some embodiments, the module 100 may be configured to receive a data stream that provides the PVT solution and be configured to calculate the dead reckoning solution. The module 100 may be configured to supplement the PVT solution with the cooperative positioning solution determined based on the relative position 170d.

In some embodiments, the module 100 may use an external processor (e.g., an off-board processor) to perform the calculations to determine the relative position data 170d. In one example, the external processor may be implemented as a distributed computing service configured to scale and/or provision resources on demand (e.g., cloud computing). For example, the module 100 may receive the signals RAA-RNN and/or do range measurement, transmit the data to the cloud computing service and one or more processors of the cloud computing service may perform the calculations for generating the relative position data 170d. The module 100 may receive the calculations (e.g., the relative position data 170d) from the cloud computing service and store the data in the memory 132. In some embodiments, the instructions 162 may be stored on an external memory. The implementation of using the external components to supplement a capability of the module 100 may be varied according to the design criteria of a particular implementation.

Generally, the module 100 receives and/or determines a PVT solution, a dead reckoning solution and/or a cooperative positioning solution (e.g., CoP). The module 100 may be configured to separate and/or extract the data component of the dead reckoning data 170e, the data component of the PVT solution (e.g., the location data) and/or the relative position data 170d. In some embodiments, the instructions 162 may be executed by the processor 124 to provide responses to requests from other components of the vehicle 30. For example, a brake system of the vehicle 30 (e.g., one of the actuators 104a-104n) may request information from the module 100 before performing a particular response (e.g., to slow down).

The sensors 102a-102n may be configured to capture information from the environment surrounding the vehicle 30. The sensors 102a-102n may be vehicle sensors (e.g., speedometer, fluid sensors, temperature sensors, etc.). In some embodiments, data from the sensors 102a-102n may be used to determine the dead reckoning data 170e. In one example, the sensors 102a-102n may be various types of sensors configured to determine vehicle movement (e.g., magnetometers, accelerometers, wheel click sensors, vehicle speed sensors, gyroscopes, etc.). In another example, data from the sensors 102a-102n may be used to determine distances and/or directions traveled from a reference point. The types of sensors 102a-102n implemented may be varied according to the design criteria of a particular implementation.

The actuators 104a-104n may be components of the vehicle 30 configured to cause an action, move and/or control an aspect of the vehicle 30. For example, the actuators 104a-104n may be one or more of a braking system, a steering system, a lighting system, windshield wipers, a heating/cooling system, etc. In some embodiments, the actuators 104a-104n may be configured to respond to information received from the module 100 and/or the sensors 102a-102n. For example, if one of the actuators 104a-104n is a steering system, the steering system may receive information from the module 100 indicating that a collision with a nearby vehicle is likely and the steering system may respond by causing the vehicle to change direction. The types of actuators 104a-104n implemented may be varied according to the design criteria of a particular implementation.

In some embodiments, the sensors 102a-102n and/or the actuators 104a-104n may be implemented to enable autonomous driving of the vehicle 30. For example, the sensors 102a-102n may receive and/or capture input to provide information about the nearby environment. The information captured by the sensors 102a-102n may be used by components of the vehicle 30 and/or the module 100 to perform calculations and/or make decisions. The calculations and/or decisions may determine what actions the vehicle 30 should take. The actions that the vehicle 30 should take may be converted into signals readable by the actuators 104a-104n. The actuators 104a-104n may cause the vehicle 30 to move and/or respond to the environment. For example, the module 100 may present an output that provides a relative position of the vehicle 30 to other vehicles. In some embodiments, the module 100 may provide the relative position data 170d (e.g., the cooperative positioning solution) to increase an ASIL classification of the vehicle 30. Other components may be configured to use the data provided by the module 100 to make appropriate decisions for autonomous driving.

The modules 100a-100n may be configured to use round-trip time for estimating relative positions. Using round-trip time to estimate relative positions may result in a multitude of solutions (e.g., since there may be more unknowns than the number of equations). The modules 100a-100n may be configured to reliably and/or unambiguously obtain relative distances between objects (e.g., the objects 30a-30n) by means of round-trip time measurements.

The modules 100a-100n may be configured to perform a position estimation. For example, the modules 100a-100n may each comprise the transceiver 122 configured to send and/or receive the radio signals RAA-RNN. The processor 124 of each of the modules 100a-100n may be configured to repeatedly perform a number of steps according to the instructions 162. In one example, the processor 124 may execute one or more of the instructions 162 to calculate a time of flight (TOF) for the signals RAA-RNN. For example, the signals RAA-RNN may be sent pair-wise between two of the transceivers 122 (e.g., a transceiver 122 implemented by the module 100a and a transceiver 122 implemented by the module 100b). In another example, the processor 124 may execute one or more of the instructions 162 to calculate possible positions for the modules 100a-100n, which may result in many possible positions for each of the modules 100a-100n. In yet another example, the processor 124 may execute one or more of the instructions 162 to perform multi-dimensional scaling (MDS) calculations in order to obtain relative positions of the modules 100a-100n in a particular coordinate system. In some embodiments, the processor 124 may be configured to repeatedly perform a procrusting procedure (e.g., after two initial MDS calculations and between every two consecutive MDS calculations). The procrusting procedure may comprise translation, scaling and/or rotation of the particular coordinate system to generate a corrected coordinate system. For example, the procrusting procedure may be configured to determine the corrected present coordinate system such that a smallest change for the relative positions of the modules 100a-100n (e.g., the relative position data 170d) between the consecutive MDS calculations may be obtained.

In some embodiments, for each pair of the modules 100a-100n, the processor 124 may be configured to calculate time of flight as the time for one of the signals RAA-RNN to travel from the transmitting transceiver (e.g., the transceiver 122 of the module 100a) to a receiving transceiver (e.g., the transceiver 122 of the module 100b). In some embodiments, the processor 124 may be configured to calculate time of flight as the time for one of the signals RAA-RNN to travel from a transmitting transceiver to a receiving transceiver and back to the transmitting transceiver (e.g., at least one time, such that round-trip time (RTT) may be determined for each pair of the modules 100a-100n). In some embodiments, the processor 124 may be configured to calculate time of flight either with knowledge of a delay time between each re-transmission and/or by repeated transmissions that comprise time stamps generated by the different modules 100a-100n (e.g., to indicate when the signals RAA-RNN were received by each of the modules 100a-100n). The method of determining the time of flight may be varied according to the design criteria of a particular implementation.

The signals RAA-RNN may be configured to be compatible with a mobile base system protocol. In one example, the protocol implemented by the signals RAA-RNN may be a basic safety message (BSM) plus additional information. Generally, BSM type messages may broadcast similar information. The modules 100a-100n may be configured to send a small message outside of the standard BSM type message protocol. For example, the round-trip time and/or the time stamp 170c may be transmitted as part of the signals RAA-RNN but outside of the BSM message. The signals RAA-RNN may be transmitted at a pre-determined update rate. In one example, the update rate of the signals RAA-RNN may be 10 Hz (e.g., 100 ms). In some embodiments, the signals RAA-RNN may be transmitted as BSM signals via a standard service channel. For example, using the standard service channel, the signals RAA-RNN may be transmitted to a cluster head for the objects 30a-30n. If a target object is outside a range of the service channel, multihopping may be implemented (e.g., transmitting the signals RAA-RNN from a local cluster head to another cluster head and then to the target vehicle). The protocol(s) implemented by the signals RAA-RNN may be varied according to the design criteria of a particular implementation.

Figure 3:
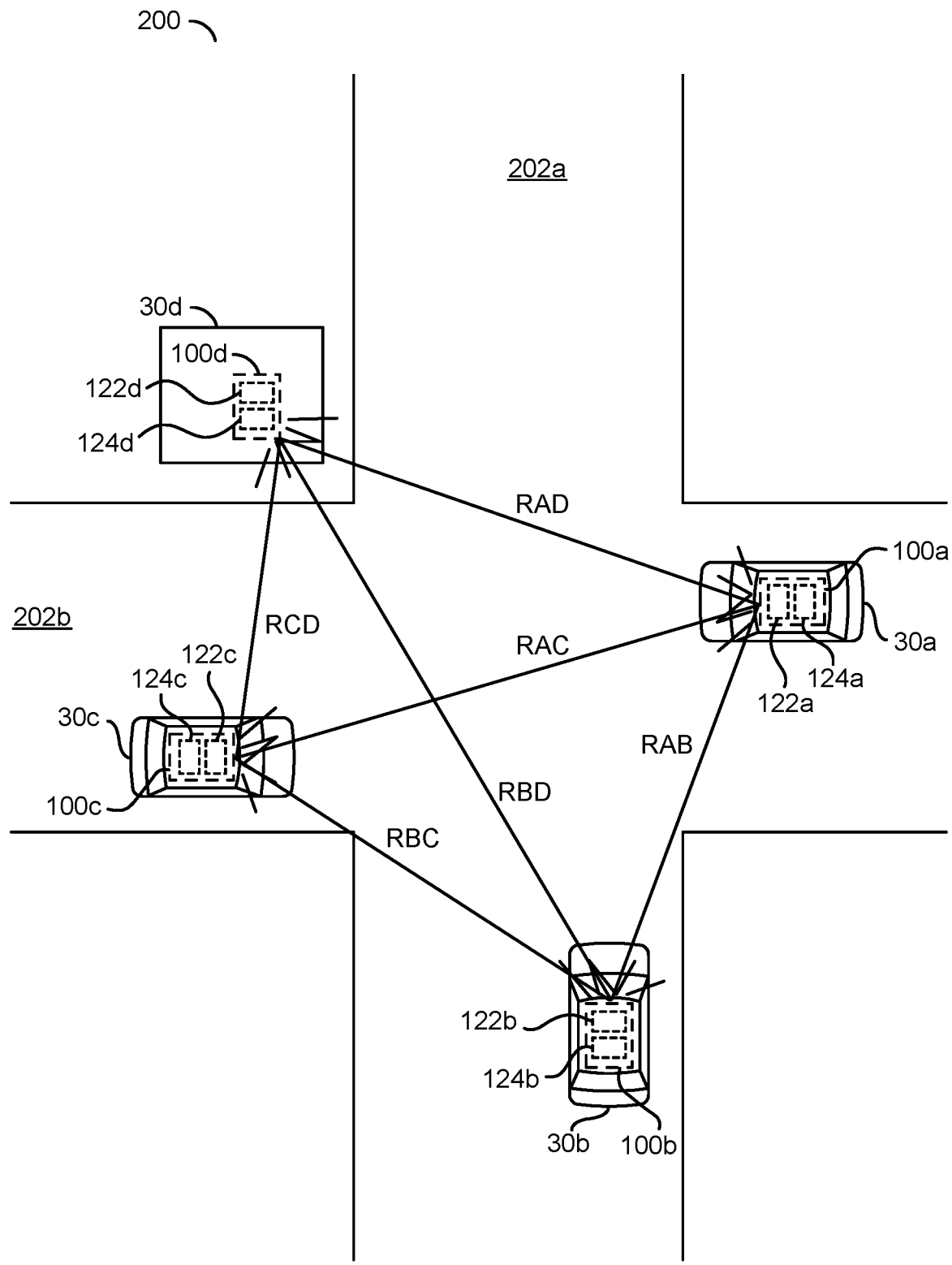
FIG. 3 is a diagram illustrating inter-vehicle range estimation.

Referring to FIG. 3 a diagram illustrating inter-vehicle range estimation is shown. An example system 200 is shown. The example system 200 may be implemented by four objects 30a-30d at an intersection of a road 202a and a road 202b. Each of the objects 30a-30d may comprise a corresponding one of the modules 100a-100d. In the example system 200, the objects 30a-30c may be vehicles and the object 30d may be infrastructure (e.g., a cell phone tower, a traffic sign, a traffic light, part of a building, etc.). On the vehicle 30a, the transceiver 122a and the processor 124a are shown. Similarly, the objects 30b-30d may comprise transceivers 122b-122d and/or processors 124b-124d. Generally, the example system 200 comprises four of the modules 100a-100n. However, the number of the modules 100a-100n may be varied according to the design criteria of a particular implementation.

In the example system 200, the modules 100a-100d may communicate between at least two other of the modules 100a-100d. The signal RAB is shown being transmitted between the vehicle 30a and the vehicle 30b, the signal RAC is shown being transmitted between the vehicle 30a and the vehicle 30c, the signal RAD is shown being transmitted between the vehicle 30a and the object 30d, the signal RBC is shown being transmitted between the vehicle 30b and the vehicle 30c, the signal RBD is shown being transmitted between the vehicle 30b and the object 30d, and the signal RCD is shown being transmitted between the vehicle 30c and the object 30d. The signals RAA-RNN may be transmitted simultaneously, in a particular order, in response to one of the signals RAA-RNN and/or periodically. The signals RAA-RNN may be transmitted back and forth between each of the modules 100a-100n.

In some embodiments, each of the modules 100a-100d may be configured to calculate the round-trip time for each of the signals RAB-RCD sent between each of the modules 100a-100d. For example, the module 100a may be configured to calculate the round-trip time for each of the signals RAB-RAD sent from the module 100a to the other modules 100b-100d, as well as the round-trip times for the signals RAB, RBC and/or RBD sent by the module 100b to the other modules 100a, 100c and/or 100d, the signals RAC, RBC and/or RCD sent by the module 100c to the other modules 100a, 100b and/or 100d and/or the signals RAD, RBD and/or RCD sent by the module 100d to the other modules 100a-100c. Using the calculated round-trip times, each of the processing units 124a-124d may be configured to calculate possible positions for the modules 100a-100d (and the objects 30a-30d), which may result in multiple possible positions for each of the modules 100a-100d (e.g., since there are more unknowns than the number of equations).

In some embodiments, the modules 100a-100d may be configured to calculate a time of flight (TOF) (e.g., pairwise) between two of the modules (e.g., 100a-100b) among the modules 100a-100d, one or more times. In one example, for each pair of the modules 100a-100d, the processors 124a-124d may be configured to determine the time of travel of the signals RAB-RCD from a transmitting one of the modules 100a-100d to a receiving one of the modules 100a-100d (e.g., a time of travel of the signal RAB from the transmitting module 100a to the receiving module 100b). To determine the time of travel (e.g., for time of flight), the modules 100a-100d may have synchronized clocks (e.g., the clocks 130 may be synchronized). In another example, for each pair of the modules 100a-100d, the processors 124a-124d may be configured to determine the round-trip time of travel of the signals RAB-RCD from a transmitting one of the modules 100a-100d to a receiving one of the modules 100a-100d and back to the transmitting one of the modules 100a-100d (e.g., a time of travel of the signal RBC from the transmitting module 100b to the receiving module 100c and back to the transmitting module 100b from the receiving module 100c, possibly including a delay time). To determine the time of travel (e.g., for round-trip time), the clocks 130 may not need to be synchronized, but the delay 170c may be known. If the delay time 170c is not known, repeated transmissions may be implemented (e.g., with 5 time stamps at the different modules 100a-100d).

Each of the processors 124a-124d may determine the possible positions for the modules 100a-100d. The processors 124a-124d may be configured to perform a multi-dimensional scaling (MDS) operation. The MDS operation may be implemented to calculate relative positions of the modules 100a-100d in a coordinate system. The processors 124a-124d may be configured to perform another MDS operation (e.g., at a later time). The MDS operation may be implemented to calculate another set of relative positions of the modules 100a-100d in another coordinate system. For example, a first MDS operation may determine relative positions in a first coordinate system and a second MDS operation may determine relative positions in a second coordinate system.

Each of the processors 124a-124d may be configured to perform a procrusting procedure. The procrusting procedure may comprise one or more of translation operations, scaling operations and/or rotation operations of one of the coordinate systems used by the MDS operations. The procrusting procedure may be configured to generate a corrected coordinate system. The corrected coordinate system may be implemented to determine a smallest change for the relative positions of the modules 100a-100d between the first MDS operation and the second MDS operation. The modules 100a-100d may be configured to continually perform MDS operations. For each of the following MDS operations, the procrusting procedure may be performed to generate an updated (e.g., current) corrected coordinate system.

The processors 124a-124d may be configured to continually and/or repeatedly calculate a TOF and/or RTT for the signals RAB-RCD sent between the modules 100a-100d, calculate possible positions for the modules 100a-100d (e.g., which may result in numerous possible positions for each of the modules 100a-100d), and/or perform MDS operations in order to obtain relative positions of the modules 100a-100d in a coordinate system. After two initial MDS operations, the processors 124a-124d may be configured to repeatedly perform a procrusting procedure between MDS calculations. In one example, the procrusting procedure may be performed between every two consecutive MDS calculations. The procrusting procedures may generate the corrected coordinate system (e.g., corresponding to the current location of the vehicles 30a-30d). In one example, the procrusting procedure may be performed using a Maximum Likelihood Estimation (MLE) computation. In another example, the procrusting procedure may be performed using a Least Squares Estimation (LSE) computation. In some embodiments, vehicle dynamics comprising gyro data, acceleration data and/or velocity data (e.g., data from the sensors 102a-102n, the dead reckoning data 170d and/or the position coordinates 170a) may be used by the processors 124a-124d (e.g., to enhance the accuracy of the calculated solution).

The modules 100a-100d may be connected to a warning and/or information device (e.g., a heads up display, an infotainment unit, an audio system, etc.) implemented in a corresponding one of the objects 30a-30d. For example, the warning and/or information device may be configured to send a notification and/or alert to the driver of a vehicle based on the cooperative positioning data calculated by the modules 100a-100d (e.g., a warning if a collision is likely). In some embodiments, the modules 100a-100d may be configured to communicate (e.g., via the electronic bus 106) to other vehicle environment detection devices (e.g., the sensors 102a-102n). For example, the sensors 102a-102n may comprise devices (e.g., radar devices, camera devices, LIDAR devices, etc.) configured to determine a position of one of the objects 30a-30d.

In some embodiments, the objects 30a-30d may not each implement one of the modules 100a-100d. For example, the vehicle 30a may implement the module 100a-100d and the objects 30b-30d may implement the transceivers 122b-122d. Implementing the transceivers 122b-122d without the modules 122b-122d may enable the objects 30b-30d to communicate the signals RAB-RCD but the calculations for the cooperative positioning solution may be performed by the module 100a. For example, the module 100a may determine the cooperative position solution from the signals RAB-RCD and send the data to each of the transceivers 122b-122d to provide the cooperative position solution to the other objects 30b-30d.

In some embodiments, in order to acquire an estimate of the relative position data 170d of the modules 100a-100d within an acceptable tolerance, the processors 124a-124d may be configured to repeatedly perform at least five procrusting procedures with intermediate MDS calculations. In some embodiments, the processors 124a-124d may be configured to calculate time of flight either with knowledge of a delay time between each re-transmission and/or by repeated transmissions with time stamps at the different transceivers.

To determine the relative positions of the modules 100a-100d, the MDS operations may be performed. The output generated in response to the MDS operations may present a true relative position between the objects 30a-30d. The procrusting procedure may be configured to rotate (e.g., rotating an X-Y diagram) the relative positioning (e.g., mirrored and/or translated) to provide additional compensation. The additional compensation performed by the procrusting procedure may provide a correct relative positioning (e.g., the relative position data 170d).

In the example shown, four objects (e.g., 30a-30d) are shown transmitting the signals RAB-RCD. The number of signals and/or objects may be varied according to the design criteria of a particular implementation. Increasing the number of objects (e.g., 30a-30n) may improve an accuracy of the cooperative positioning solution calculated at the cost of computational efficiency. Decreasing the number of objects (e.g., less than four of the objects 30a-30d) may decrease a computational cost but may not provide sufficient accuracy (e.g., the accuracy of the cooperative positioning solution may not be an improvement over a GNSS solution). Generally, determining a cooperative positioning solution using four of the objects 30a-30n may provide a balanced tradeoff between an accuracy of the relative positioning coordinates 170d and the computational processing power of the processor 124. For example, using more than four of the objects 30a-30n may provide diminishing returns on the accuracy of the relative positioning coordinates 170d.

In some embodiments, the modules 100a-100d may be configured to predict a trajectory (e.g., path) of the objects 30a-30d. The modules 100a-100d may calculate and/or receive an associated location and/or velocity (e.g., a low accuracy position, speed and/or heading) for each of the objects 30a-30d. In one example, the predicted trajectory may be calculated using the GPS heading and/or GPS speed information. In another example, the predicted trajectory may be calculated using the time of flight and/or round-trip time information. In yet another example, the predicted trajectory may be calculated based on the shape and/or path of the roads 202a-202b. In still another example, one or more of the objects 30a-30d may not have a predicted trajectory and/or have a null value for the predicted trajectory (e.g., the object 30d may be stationary). The predicted trajectory may be communicated to/from the modules 100a-100d as data messages using the signals RAB-RCD and/or stored in the memory 132.

Figure 4:
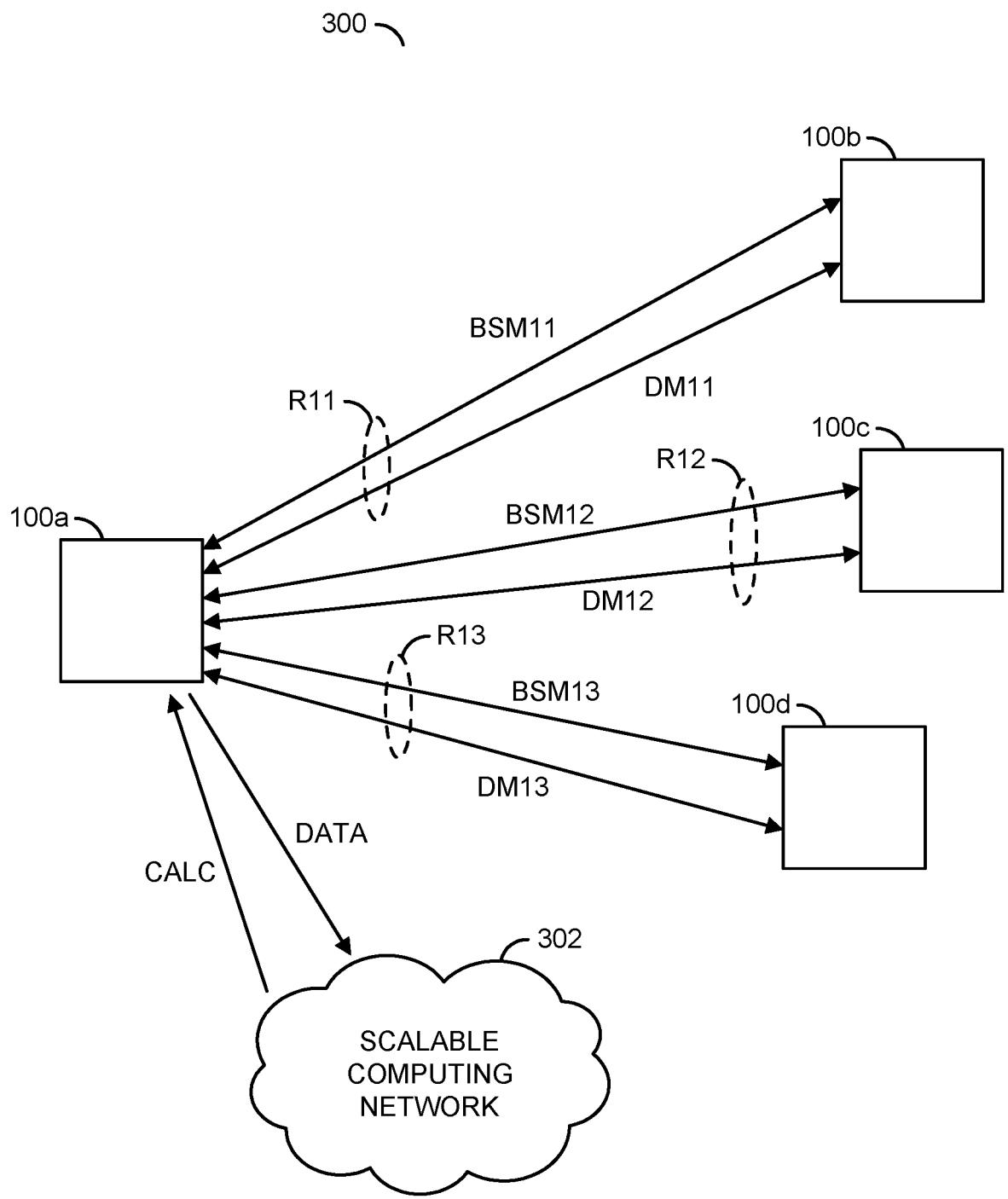
FIG. 4 is a diagram illustrating a system for communicating data messages using a communication protocol.
Figure 5:
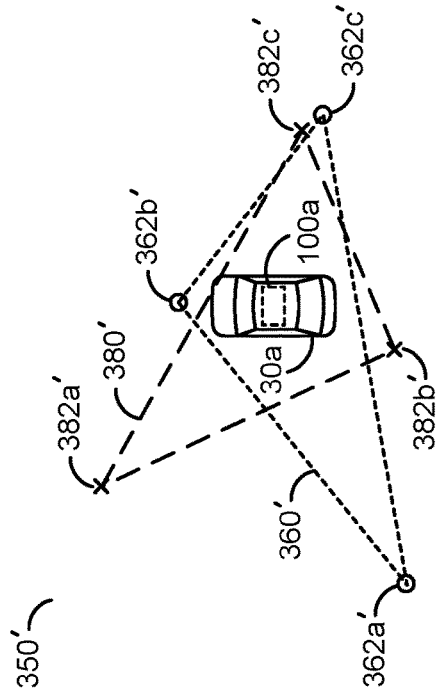
FIG. 5 is a diagram illustrating an example configuration of a procrusting procedure.

Referring to FIG. 4, a diagram illustrating a system 300 for communicating data messages using a communication protocol is shown. The system 300 may comprise the modules 100a-100d, and a block (or circuit) 302. The block 302 may implement a scalable computing network. In the example shown, the module 100a may be implemented in the host vehicle (e.g., 30a). In the example shown, the module 100a may communicate with three other modules 100b-100d. Generally, to determine the cooperative positioning solution, the host module 100a may communicate with at least three other objects (e.g., the vehicles and/or base stations 30a-30n). A minimum of three vehicles may be needed to determine the cooperative positioning solution (e.g., the host vehicle 30a and two other vehicles) having an accuracy that improves on the GNSS solution. The number of modules (e.g., 100a-100n) implemented by the system 300 may be varied according to the design criteria of a particular implementation.

The signal R11 is shown being transmitted between the module 100a and the module 100b. The signal R12 is shown being transmitted between the module 100a and the module 100c. The signal R13 is shown being transmitted between the module 100a and the module 100d. The signals R11-R13 are shown as bi-directional. In some embodiments, the signals R11-R13 may be communicated back and forth (e.g., sequentially). In one example, the module 100a may communicate the signal R11 (comprising a first set of data) to the module 100b and then the module 100b may communicate the signal R11 (e.g., comprising a second set of data and/or appending additional data to the first set of data) to the module 100a (e.g., two discrete signals sent in different directions at different times). In some embodiments, the modules 100b-100d may communicate with each other (e.g., the signals R21-RNN may be communicated between the modules 100b-100n). The sequence, the number and/or the timing of the communication of the signals R11-RNN may be varied according to the design criteria of a particular implementation.

The signal R11 is shown comprising a signal (e.g., BSM11) and a signal (e.g., DM11). The signal R12 is shown comprising a signal (e.g., BSM12) and a signal (e.g., DM12). The signal R13 is shown comprising a signal (e.g., BSM13) and a signal (e.g., DM13). The signals BSM11-BSM13 may be sent in different channels from the signals DM11-DM13 within the signals R11-R13. The signals BSM11-BSM13 may each comprise data associated with a vehicle-to-vehicle and/or vehicle-to-infrastructure (e.g., V2X) communication protocol. In one example, the signals BSM11-BSM13 may comprise a Basic Safety Message. In another example, the signals BSM11-BSM13 may implement an A la Carte Message (ACM). In yet another example, the signals BSM11-BSM13 may comprise Wi-Fi communication (e.g., future Wi-Fi protocols may implement RTT time stamps as part of a lower layer protocol such as MAC and/or PHY). In still another example, a generic transfer message may be implemented (e.g., when one of the objects 30a-30n is a roadside unit such as the base station 30i, as shown in association with FIG. 1). The signals DM11-DM13 may comprise data associated with a data message. The data message may comprise data usable by the modules 100a-100n to calculate the cooperative positioning solution and/or the relative positioning data 170d. In an example, the data messages may comprise the time stamp information for performing signal distance calculations (e.g., a round-trip time calculation and/or a time of flight calculation). Similarly, each of the signals R11-RNN may comprise respective signals BSM11-BSMNN and/or DM11-DMNN.

In some embodiments, the signals BSM11-BSMNN may implement the BSM protocol. In one example, the BSM protocol may be a subset of the Society of Automotive Engineers (SAE) J2735, conveyed in the 5.9 GHz DSRC medium according to IEEE 802.11p and 1609.2-1609.4. The signals BSM11-BSMNN may comprise messages indicating a location (e.g., low accuracy) of the corresponding vehicles 30a-30n at a particular time. The signals BSM11-BSMNN may comprise other data (e.g., vehicle status) and/or a signature to enable the modules 100a-100n to perform an authenticity check (e.g., make a reasonable confirmation that the message was sent from the particular source and was not altered). BSM messages may be validated with a checksum and/or other integrity check, and passed through a misbehavior detection system to attempt to filter malicious and/or misconfigured messages.

In some embodiments, the signals R11-RNN may operate at approximately 5.9 GHz (e.g., 5.850 GHz-5.925 GHz). The 5.9 GHz band may be divided into seven, non-overlapping 10 MHz channels. In one example, one channel may implement a control channel, and the other six channels may be service channels. The control channel may be configured for broadcasting safety data (e.g., warning messages) to alert drivers of conditions that may need attention. The service channels may be configured to exchange safety and/or non-safety data (e.g., commercial announcements, video/audio download, digital maps, etc.). The signal BSM11-BSMNN may have a range of approximately 300 meters. Details of the signals BSM11-BSMNN may be described in more detail in association with FIG. 9.

The data messages DM11-DM13 may comprise one or more time stamps (e.g., time stamp information). The time stamps in the data messages DM11-DM13 may be implemented to enable the relative positioning module 152 to determine a round-trip time calculation and/or a time of flight calculation of the transmission of the signals R11-R13 between the module 100a and the modules 100b-100d. The data messages DM11-DM13 may be used similar to a radar by providing a signal for the relative positioning module 152 to measure how long the signals R11-RNN take to be sent and return to the source (e.g., the module 100a) in order to calculate a value of the range between the vehicles 30a-30n. Details of the channels used to transmit the signals BSM11-BSM13 and/or the signals DM11-DM13 may be described in more detail in association with FIG. 9.

A signal (e.g., CALC) and a signal (e.g., DATA) are shown. The module 100a may be configured to transmit the signal DATA to the scalable computing network 302. The scalable computing network 302 may be configured to transmit the signal CALC to the module 100a. In some embodiments, each of the modules 100a-100n may be configured to send a respective version of the signal DATA to the scalable computing network 302 and/or receive a respective version of the signal CALC from the scalable computing network 302. The signal DATA and/or the signal CALC may be communicated using a wireless transmission protocol. In one example, the signal DATA and/or the signal CALC may be transmitted using a Wi-Fi communication protocol. In another example, the signal DATA and/or the signal CALC may be transmitted using a cellular communication protocol (e.g., 3G/4G/5G/LTE). The method of communicating the signal DATA and/or the signal CALC between the modules 100a-100n and the scalable computing network 302 may be varied according to the design criteria of a particular implementation.

The signal DATA may comprise the data messages received by the module 100a from each of the modules 100b-100d. For example, the signal DATA may comprise information from the signal(s) R11, R12 and/or R13. The module 100a may aggregate the data messages received from the signals DM11, DM12 and/or DM13. The aggregated data messages may be sent to the scalable computing network 302 as part of the signal DATA. In some embodiments, the data messages may be sent to the scalable computing network 302 as received by the module 100a (e.g., transmitted in sequence in near real-time) and/or in bulk transmissions combining groups of the data messages.

In some embodiments, the module 100a may not be configured to calculate the cooperative positioning solution. In an example, the computational resources for determining the cooperative positioning solution may be greater than the processor 124 may be able to provide (e.g., within a time frame that provides useful results in a high speed traffic scenario). The modules 100a-100n may be configured to off-load the calculation (or one or more portions of the calculation) of the cooperative positioning solution to the computing resources available on the scalable computing network 302. The scalable computing network 302 may be configured to perform the calculations for the cooperative positioning solution and present the results of the calculation to the modules 100a-100n as the signal CALC.

The scalable computing network 302 may be configured to provide processing services. In one example, the signal DATA may be received by the scalable computing network 302, the scalable computing network 302 may perform calculations using the signal DATA, generate results, and present the results as the signal CALC. The scalable computing network 302 may be configured to provide distributed computing and/or processing. In an example, the scalable computing network 302 may comprise multiple processors, multiple processing cores and/or multiple ASICs working together. The scalable computing network 302 may be configured to perform the processing and/or provision processing resources on demand. In an example, if many of the modules 100a-100n present respective signals DATA for processing, the scalable computing network 302 may dedicate more computing resources to determine each of the cooperative positioning solutions (e.g., using more computing resources may result in larger fees from the provider of the scalable computing network 302). The scalable computing network 302 may provision resources to many different customers (e.g., the scalable computing network 302 may not be dedicated to determining the cooperative positioning solution for the modules 100a-100n). The implementation of the scalable computing network 302 may be varied according to the design criteria of a particular implementation.

The module 100a may aggregate the data messages DM11-DM13 and/or the signals BSM11-BSM13 and send the aggregated information and/or additional information as the signal DATA. The signal DATA may be received by the scalable computing network 302. The scalable computing network may perform the calculations for determining the cooperative positioning solution. In one example, the scalable computing network 302 may perform the MDS calculations. In another example, the scalable computing network 302 may perform the procrusting procedure. In yet another example, the scalable computing network 302 may perform the signal distance calculations. The calculations performed by the scalable computing network 302 may be varied according to the design criteria of a particular implementation.

The scalable computing network 302 may generate the signal CALC. The signal CALC may comprise the cooperative positioning solution (e.g., the relative positioning data 170d). The cooperative positioning solution calculated by the scalable computing network 302 may be transmitted as the signal CALC. In the example shown, the signal CALC may be sent by the scalable computing network 302 to the module 100a. The module 100a may communicate the cooperative positioning solution to each of the other modules 100b-100d. In some embodiments, the scalable computing network 302 may communicate the signal CALC to each of the modules 100a-100n.

Referring to FIGS. 5-8, various portions of the procrusting procedure are shown. The procrusting procedure may be performed by the processor 124 (e.g., the relative positioning module 152) and/or the scalable computing network 302. The procrusting procedure may comprise a translation, a rotation and/or a scaling of one or more configurations. In some embodiments, other calculations may be performed as part of the procrusting procedure. In one example, the procrusting procedure may implement a least-squares orthogonal mapping. The procrusting procedure may be implemented to compare two sets of data. In one example, the two sets of data may be a first reading of the signals R11-RNN and a second reading of the signals R11-RNN (e.g., a reading received at a later time than the first reading). Generally, the procrusting procedure performs calculations to attempt to match corresponding data points as closely as possible from two data sets. In the example implemented by the modules 100a-100n (or the scalable computing network 302), the data points may be the relative physical location of the objects 30a-30n. The procrusting procedure may be configured to perform calculations that lead to a minimization of the sum of the squared deviations (e.g., the error, often referred to as the $m^2$ term, between the data points). If the error is greater than a predetermined acceptable amount of error, then the data may be discarded Referring to FIG. 5, a diagram illustrating an example configuration 350 of a procrusting procedure is shown. The example configuration may comprise the host vehicle 30a and/or the module 100a. An arrangement 360 is shown. The arrangement 360 may comprise a point 362a, a point 362b and/or a point 362c. The arrangement 360 may be a triangular shape representing a spatial relationship between the points 362a-362c. An arrangement 380 is shown. The arrangement 380 may comprise a point 382a, a point 382b and/or a point 382c. The arrangement 380 may be a triangular shape representing a spatial relationship between the points 382a-382c. In the example shown, the arrangement 360 and/or the arrangement 380 may each comprise three points. However, the number of points may be varied according to the design criteria of a particular implementation.

The points 362a-362c may represent sampling location information of the objects 30b-30n received and/or calculated by the module 100a (e.g., a first data set). Similarly, the points 382a-382c may represent sampling location information of the objects 30b-30n received and/or calculated by the module 100a (e.g., a second data set). In one example, the points 362a-362c and/or the points 382a-382c may be determined from the signals DM11-DM13. For example, the points 362a-362c and/or 382a-3822c may represent a physical location. The points 362a-362c may correspond to sampling location information determined at a different time than the points 382a-382c (e.g., corresponding to the same respective object). In one example, the points 362a-362c may represent sampling location information from a first reading of the signals DM11-DM13 (e.g., for the vehicles 30b-30d) and the points 382a-382c may represent sampling location information from a subsequent reading of the signals DM11-DM13 (e.g., a second reading received at a later time (e.g., after 100 ms at a 10 Hz update rate) that provides updated information of the location of the vehicles 30b-30d). In another example, the points 362a-362c may represent sampling location information from a reading from a first module (e.g., the module 100a implemented on the vehicle 30a) and the points 382a-382c may represent sampling location information from a reading from a second module (e.g., the module 100b implemented on the vehicle 30b). Generally, the procrusting calculation may be performed individually by each of the modules 100a-100n. For example, the possibility of improved positioning information from the other vehicles 30b-30n may be used in the local calculation by the module 100a for the vehicle 30a.

The points 362a-362c and/or the points 382a-382c may represent sampling locations of vehicles, people, base stations, road-side units, infrastructure, etc. In one example, the point 382c may represent a vehicle located to the right and slightly behind the vehicle 30a. The locations of the points 362a-362c and/or the points 382a-382c with respect to the vehicle 30a may be an illustrative example (e.g., may not be representative of sampling locations in real-life scenarios).

Figure 6:
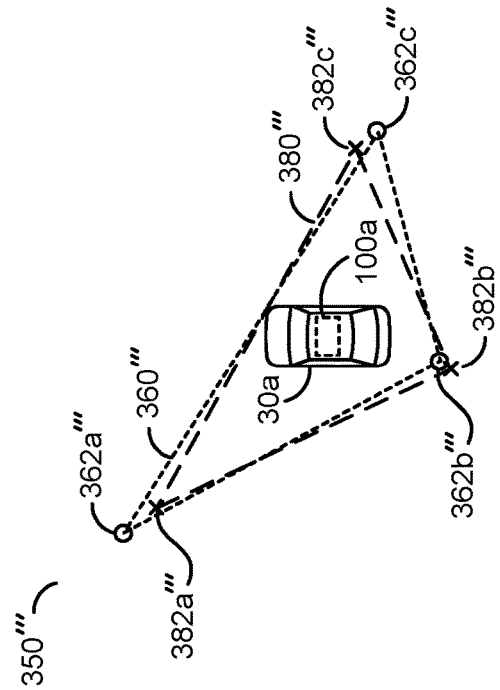
FIG. 6 is a diagram illustrating an example configuration after a translation portion of a procrusting procedure.

Referring to FIG. 6, a diagram illustrating an example configuration 350' after a translation portion of a procrusting procedure is shown. The relative positioning module 152 may be configured to perform a translation calculation on the points 362a-362c and/or the points 382a-382c (shown in association with FIG. 5) and generate an output and/or result comprising the points 362a'-362c' and/or the points 382a'-382c'. The translation performed by the relative positioning module 152 may be one of multiple components of the procrusting procedure.

The arrangement 360' may comprise the translated points 362a'-362c'. The arrangement 360' generated by the relative positioning module 152 may represent a translated version of the arrangement 360. The arrangement 380' may comprise the translated points 382a'-382c'. The arrangement 380' generated by the relative positioning module 152 may represent a translated version of the arrangement 380. The translation performed by the relative positioning module 152 may be configured to move the arrangement 360' and/or the arrangement 380' to have a common centroid. In one example, the triangular shapes of the arrangement 360 and the arrangement 380 (shown in association with FIG. 5) may not have a common center point. In the example shown in FIG. 6, the triangular shapes of the arrangement 360' and the arrangement 380' may be approximately centered over the vehicle 30a (or the module 100a).

Figure 7:
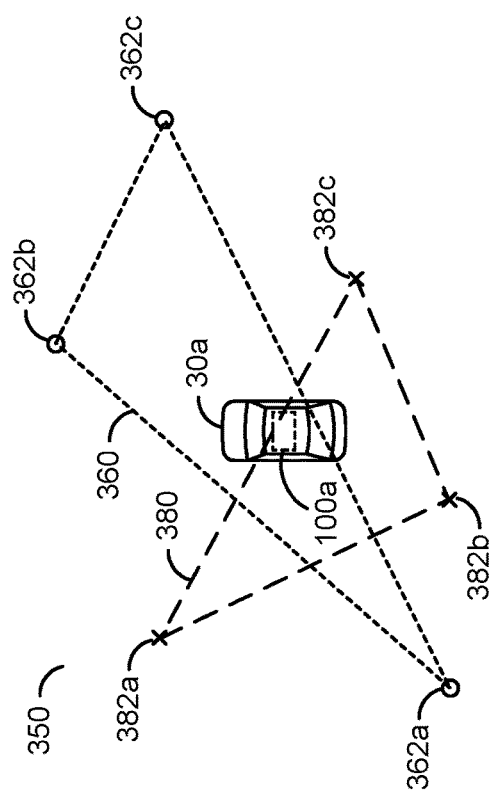
FIG. 7 is a diagram illustrating an example configuration after a rotation portion of a procrusting procedure.

Referring to FIG. 7, a diagram illustrating an example configuration 350'' after a rotation portion of a procrusting procedure is shown. The relative positioning module 152 may be configured to perform a rotation calculation on the points 362a'-362c' and/or the points 382a'-382c' (shown in association with FIG. 6) and generate an output and/or result comprising the points 362a''-362c'' and/or the points 382a''-382c''. The rotation performed by the relative positioning module 152 may be one of multiple components of the procrusting procedure.

The arrangement 360'' may comprise the rotated points 362a''-362c''. The arrangement 360'' generated by the relative positioning module 152 may represent a rotated and translated version of the arrangement 360. The arrangement 380'' may comprise the rotated points 382a''-382c''. The arrangement 380'' generated by the relative positioning module 152 may represent a rotated and translated version of the arrangement 380. The rotation performed by the relative positioning module 152 may be configured to move the arrangement 360'' and/or the arrangement 380'' to have a common alignment. In one example, one or more of the triangular shapes of the arrangement 360' and the arrangement 380' (shown in association with FIG. 6) may be rotated about the common center point (e.g., the module 100a and/or the vehicle 30a).

Figure 8:
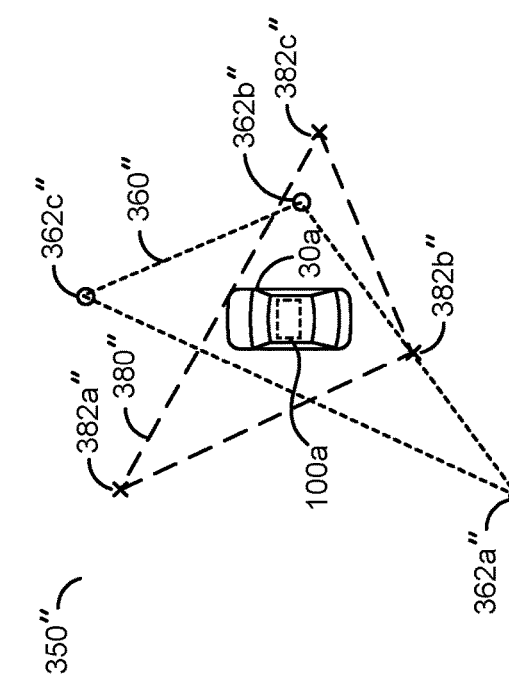
FIG. 8 is a diagram illustrating an example configuration after a dilation portion of a procrusting procedure.

Referring to FIG. 8, a diagram illustrating an example configuration 350''' after a dilation portion of a procrusting procedure is shown. The relative positioning module 152 may be configured to perform a dilation and/or scaling calculation on the points 362a''-362c'' and/or the points 382a''-382c'' (shown in association with FIG. 7) and generate an output and/or result comprising the points 362a'''-362c''' and/or the points 382a'''-382c'''. The dilation performed by the relative positioning module 152 may be one of multiple components of the procrusting procedure.

The arrangement 360''' may comprise the scaled points 362a'''-362c'''. The arrangement 360''' generated by the relative positioning module 152 may represent a scaled, rotated and translated version of the arrangement 360. The arrangement 380''' may comprise the scaled points 382a'''-382c'''. The arrangement 380''' generated by the relative positioning module 152 may represent a scaled, rotated and translated version of the arrangement 380. The dilation performed by the relative positioning module 152 may be configured to reduce (e.g., minimize) the error between the sampled location information. The arrangement 360''' and/or the arrangement 380''' may generally match and/or overlap each other. In one example, after the translation, rotation and dilation the points 362a'''-362c''' may be close to the points 382a'''-382c'''. When the data points 362a'''-362c''' and the data points 382a'''-382c''' closely match, there may be a high amount of agreement between the data sets (e.g., the relative positioning coordinates may provide reliable information). For example, if the procrusting procedure does not generate sampling data with a low amount of error, the data may be discarded (e.g., unreliable data).

The procrusting procedure may be used to determine the changes of the relative positions using a corrected coordinate system. The translation, rotation and/or dilation may be used to provide a corrected coordinate system for the data sets. If there is high agreement between the data sets, an ASIL classification may be increased in response to the reliability and/or level of accuracy of the location parameter.

Figure 9:
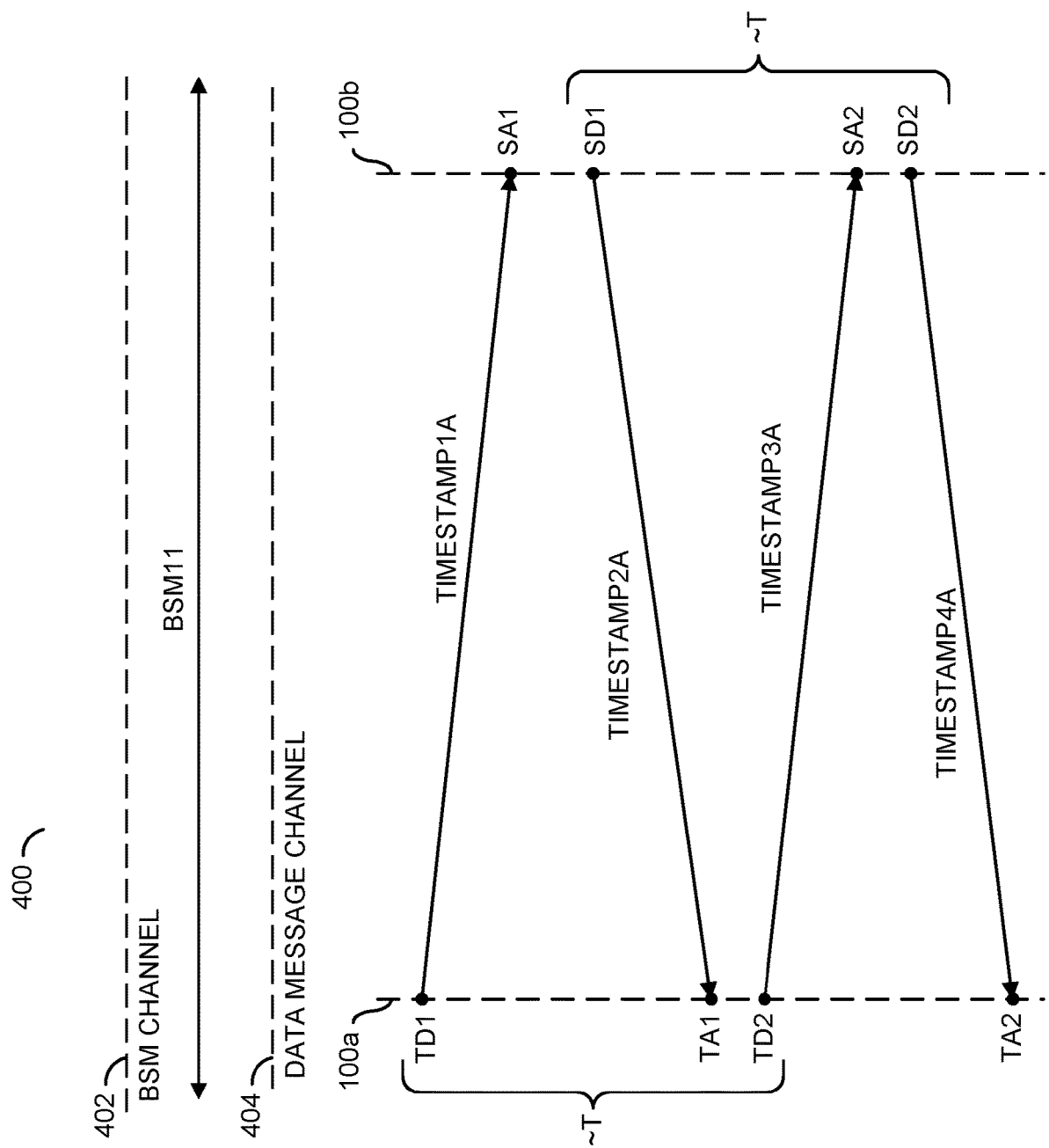
FIG. 9 is a diagram illustrating an example communication protocol comprising a basic safety message communication channel and a data message communication channel.

Referring to FIG. 9, a diagram illustrating an example communication protocol 400 is shown. The example communication protocol 400 may be an example of the data carried by signal R11 (e.g., sent between the module 100a and the module 100b). The example communication protocol 400 may be a representative example of any of the signals R11-RNN.

The example communication protocol 400 may comprise a basic safety message communication channel 402 and a data message communication channel 404. The basic safety message communication channel 402 may be implemented to communicate the signal BSM11 and the data message channel 404 may be configured to communicate the signal DM11 (e.g., as shown in association with FIG. 4). The signal BSM11 and the signal DM11 may be transmitted at the same time using different channels.

The signal BSM11 may comprise a package heading. The package heading of the signal BSM11 may comprise a Message ID, a Message Count and/or a Temporary Message ID. The Message ID may inform the receiving device that the message is a particular protocol (e.g., a Basic Safety Message by providing a value of 2). The receiving module (e.g., 100b) may interpret the signal BSM11 based on the value of the Message ID. The Message Count may be implemented to provide an order of the messages. The receiving module (e.g., 100b) may check the Message Count (e.g., a value of 0 to 127) to check that all of the messages were received. The Temporary Message ID may be configured to enable the receiving device (e.g., 100b) to associate a particular message to a particular sending device (e.g., the module 100a). For example, the Temporary Message ID may be a randomly-generated value (e.g., 4-bytes).

The signal BSM11 may comprise status elements. One part of the status elements may be core data (e.g., data that the particular protocol requires to be sent). Another part of the status elements of the signal BSM11 may be situational data (e.g., data that the particular protocol requires to be sent under particular conditions). For example, the core data may comprise vehicle location, vehicle movement, basic vehicle motion and/or vehicle size.

The vehicle location portion of the signal BSM11 may comprise a longitudinal value (e.g., x-measurement that may be accurate within 1.5 meters of the module 100a based on GPS data). For example, 1.5 meters may be within half a lane of traffic. The vehicle location portion of the signal BSM11 may comprise a lateral value (e.g., y-measurement that may be accurate within 1.5 meters of the module 100a based on GPS data). The vehicle location portion of the signal BSM11 may comprise an elevation value (e.g., z-measurement that may be accurate within 3 meters). For example, the elevation measurement may not be as accurate as the longitudinal and/or lateral measurements (e.g., sufficient enough to distinguish vehicles in an overpass/underpass scenario).

The vehicle motion portion of the signal BSM11 may comprise a speed measurement (e.g., accurate within 0.35 meters per second and/or in 0.04 meter per second increments). The vehicle motion portion of the signal BSM11 may comprise a heading measurement (e.g., an angle in relation to a vehicle reference point). The accuracy of the heading measurement may depend on the speed of the vehicle (e.g., within 2 degrees when the speed is greater than 12.5 m/s and within 3 degrees when the speed is less than or equal to 12.5 m/s). To compensate for shortcomings of GPS at low speed, a last stored heading may be used. The vehicle motion portion of the signal BSM11 may comprise an acceleration measurement (e.g., x and y accelerations within in accuracy of 0.1 m/s² and/or a vertical acceleration within 1 m/s²). The vehicle motion portion of the signal BSM11 may comprise a yaw rate (e.g., within an accuracy of 0.5 degrees per second).

Vehicle data presented in the signal BSM11 may comprise a transmission state (e.g., gear direction such as forward, neutral, reverse, etc.). Vehicle data presented in the signal BSM11 may comprise a steering wheel angle (e.g., within 5 degrees of the actual configuration of the steering wheel). The steering wheel angle may be used to confirm the actual vehicle heading measurement. Vehicle data presented in the signal BSM11 may comprise a vehicle size (e.g., a 0.2 m tolerance for length and/or width). Vehicle data presented in the signal BSM11 may comprise a brake applied status, a traction control state, a stability control status, an auxiliary brake status, an anti-lock brake status, a brake boost status, a location accuracy, a throttle state, an exterior lights state, etc.

The BSM channel 402 may be transmitted at approximately 5.855 GHz to 5.865 GHz. The BSM channel 402 may operate at 10 MHz (e.g., the BSM channel 402 may be separated into various 10 MHz channels). The BSM channel 402 may have a data rate of at least 6 megabits per second (e.g., with a maximum allowable 10 percent packet loss). The BSM channel 402 may have a transmitting range of approximately 300 meters. The BSM channel 402 may be transmitted at a random time value within a specified range of time of approximately 0.1 seconds to reduce channel congestion (e.g., 100 ms+/−a random value between 0 and 5 ms).

The data message channel 404 may comprise a number of time stamps and/or a sequence number transmitted as the signal DM11. In an example, four time stamps may be transferred independent of how the data is transferred (e.g., independent of channel and/or frequency). In the example shown, the data message channel 404 may comprise a number of signals (e.g., TIMESTAMP1A-TIMESTAMP4A) communicated between a local vehicle (e.g., using the module 100a of the host vehicle 30a) and a remote vehicle (e.g., using the module 100b of the vehicle 30b).

In the example shown, the local vehicle module 100a may transmit the signal TIMESTAMP1A to the remote vehicle module 100b at a time (e.g., TD1). The signal TIMESTAMP1A may comprise the time stamp value TD1. The remote vehicle module 100b may receive the signal TIMESTAMP1A at a time (e.g., SA1). The module 100b may respond to the signal TIMESTAMP1A by transmitting the signal TIMESTAMP2A at a time (e.g., SD1). The signal TIMESTAMP2A may comprise the time stamp value SA1 and/or the time stamp value SD1. The host vehicle module 100a may receive the signal TIMESTAMP2A at a time (e.g., TA1). After receiving the signal TIMESTAMP2A, the module 100a may have the time stamp values TD1 and/or TA1 (e.g., known internally by the module 100a) and/or the time stamp values SA1 and/or SD1 (e.g., received from the module 100b). The host vehicle module 100a may respond to the signal TIMESTAMP2A by transmitting the signal TIMESTAMP3A at a time (e.g., TD2).

The signal TIMESTAMP3A be transmitted at a time interval (e.g., T) from the time the signal TIMESTAMP1A has been transmitted by the host vehicle module 100a (e.g., the time stamp value TD1 and the time stamp value TD2 may have a difference of T). For example, the time interval T may be a period of a communication rate implemented by the modules 100a-100n. In an example, where the frequency of the communication is approximately 10 Hz, the time interval T may be 100 ms. The signal TIMESTAMP3A may comprise the time stamp value TD1, TA1 and/or TD2. The signal TIMESTAMP3A may be received by the remote vehicle module 100b at a time (e.g., SA2).

The remote vehicle module 100b may respond to the signal TIMESTAMP3A by transmitting the signal TIMESTAMP4A at a time (e.g., SD2). The signal TIMESTAMP4A may comprise the time stamp value SA1, the time stamp value SA2, the time stamp value SD1 and/or the time stamp value SD2. The signal TIMESTAMP4A be transmitted at a time interval (e.g., T) from the time the signal TIMESTAMP2A has been transmitted by the remote vehicle module 100b (e.g., the time stamp value SD1 and the time stamp value SD2 may have a difference of T).

The host vehicle module 100a may receive the signal TIMESTAMP4A at a time (e.g., TA2). After receiving the signal TIMESTAMP4A, the module 100a may have the time stamp values TD1, TD2, TA1 and/or TA2 (e.g., known internally by the module 100a) and/or the time stamp values SA1, SA2, SD1 and/or SD2 (e.g., received from the module 100b). The time stamp values TD1, TD2, TA1, TA2, SA1, SA2, SD1 and/or SD2 (e.g., the round-trip time data) may be stored in the memory 132 of the module 100a as the time stamp and/or delay data 170c. At the time TA2, the vehicle may perform the signal distance calculations using at least the time stamp values TD1, TD2, TA1, SA1, SD1 and/or SD2.

Using the round-trip time data from the other vehicle (e.g., the vehicle 30b), the host vehicle module 100a may calculate the relative range to each vehicle, perform the MDS calculation and/or perform procrusting to find an optimal size of the 'triangle' (e.g., shown in association with FIGS. 5-8) that fits the other input values. To further refine the accuracy of the calculated relative position data 170d, the host vehicle module 100a may perform the procrusting using other inputs. In one example, the other inputs may comprise previously calculated positions, vehicle dynamic information (e.g., of the host vehicle and/or the remote vehicles based on information received using the BSM channel 402 (e.g., speed, gryo information, steering wheel angle, etc.)), GNSS data (e.g., of the host vehicle using the GNSS antenna 120 and/or from the remote vehicles using information received from the BSM channel 402) and/or radios (e.g., fixed and/or moving) that provide high accuracy positional information.

Figure 10:
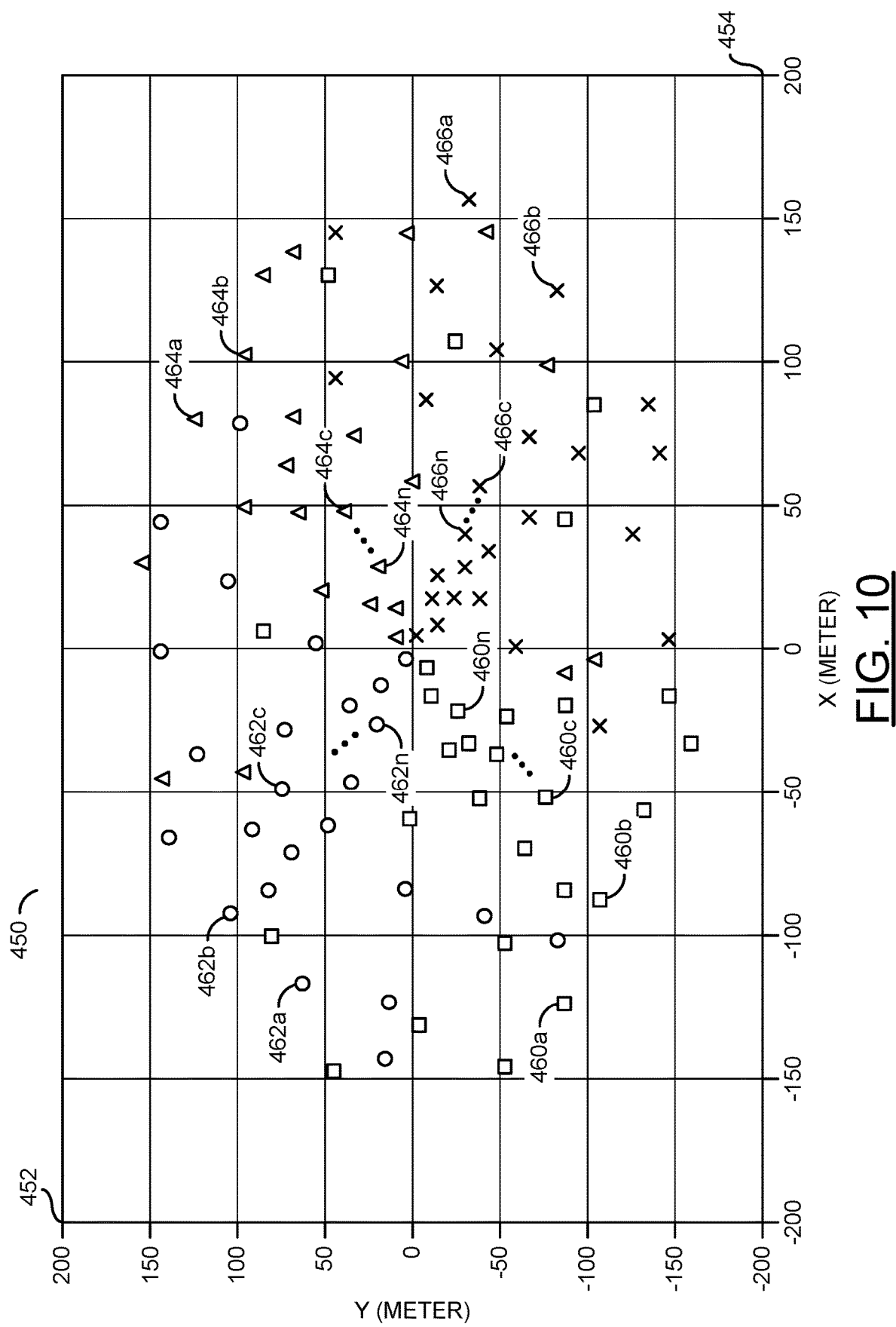
FIG. 10 is a diagram illustrating an estimation of pairwise distances.

Referring to FIG. 10, a graph 450 illustrating an estimation of pair-wise distances is shown. The graph 450 may represent a scatter plot of pair-wise distances calculated by the modules 100a-100n. In the example graph 450, estimated pair-wise distances from four of the vehicles 30a-30n are shown.

The graph 450 may comprise a Y-axis 452 and an X-axis 454. The Y-axis 452 may represent a distance range from −200 meters to 200 meters in one direction. The X-axis 454 may represent a distance range from −200 meters to 200 meters in a direction orthogonal to the direction of the Y-axis 452.

Plot points 460a-460n are shown on the graph 450. The plot points 460a-460n are each represented as a square shape (e.g., not all square shaped plot points are labeled for clarity). The plot points 460a-460n may represent estimated pair-wise distances for one of the vehicles (e.g., the vehicle 30a). Plot points 462a-462n are shown on the graph 450. The plot points 462a-462n are each represented as a circle shape (e.g., not all circle shaped plot points are labeled for clarity). The plot points 462a-462n may represent estimated pair-wise distances for one of the vehicles (e.g., the vehicle 30*b*). Plot points 464*a*-464*n* are shown on the graph 450. The plot points 464*a*-464*n* are each represented as a triangle shape (e.g., not all triangle shaped plot points are labeled for clarity). The plot points 464*a*-464*n* may represent estimated pair-wise distances for one of the vehicles (e.g., the vehicle 30*c*). Plot points 466*a*-466*n* are shown on the graph 450. The plot points 466*a*-466*n* are each represented as an X shape (e.g., not all X shaped plot points are labeled for clarity). The plot points 466*a*-466*n* may represent estimated pair-wise distances for one of the vehicles (e.g., the vehicle 30*d*).

Each of the estimated pair-wise distance plot points 460*a*-460*n*, 462*a*-462*n*, 464*a*-464*n*, and/or 466*a*-466*n* may represent a potential position determined from the signal distance calculations using the time stamps as shown in association with FIG. 9. Each of the estimated pair-wise distance plot points 460*a*-460*n*, 462*a*-462*n*, 464*a*-464*n*, and/or 466*a*-466*n* may represent an estimated location of one of the respective vehicles 30*a*-30*d* at a particular point in time on a coordinate system. The estimated pair-wise distance plot points 460*a*-460*n*, 462*a*-462*n*, 464*a*-464*n*, and/or 466*a*-466*n* may be determined by one or more of the modules 100*a*-100*d* implemented on the respective vehicles 30*a*-30*d*. In an example, where the refresh rate of the communication of the signals RAA-RNN is 10 Hz, one of the potential positions (e.g., estimated pair-wise distance plot points 460*a*-460*n*, 462*a*-462*n*, 464*a*-464*n*, and/or 466*a*-466*n*) may be determined every 100 ms. The location and/or number of the estimated pair-wise distance plot points 460*a*-460*n*, 462*a*-462*n*, 464*a*-464*n*, and/or 466*a*-466*n* may be varied according to the design criteria of a particular implementation and/or a traffic scenario.

The modules 100*a*-100*d* may transmit the signals RAB-RCD (as shown in association with FIG. 3) and the relative positioning module 152 of the processor 124 may receive the information in the data message channel 404. For example, the information in the data message channel 404 may comprise the signals TIMESTAMP1A-TIMESTAMP4A for calculating the round-trip time (e.g., signal distances) as shown in association with FIG. 9. Using the signal distance calculations, the relative positioning module 152 may determine one or more of the potential positions (e.g., estimated pair-wise distance plot points 460*a*-460*n*, 462*a*-462*n*, 464*a*-464*n*, and/or 466*a*-466*n*). Determining the estimated pair-wise distance plot points 460*a*-460*n*, 462*a*-462*n*, 464*a*-464*n*, and/or 466*a*-466*n*, may be one step of determining the relative positioning data 170*d*.

In the example shown, the plot points 460*a*-460*n* corresponding to the vehicle 30*a* may be clustered in a region of the graph 450 corresponding to an X,Y value of approximately −100, −100 and converging towards 0, 0. In the example shown, the plot points 462*a*-462*n* corresponding to the vehicle 30*b* may be clustered in a region of the graph 450 corresponding to an X,Y value of approximately −100, 100 and converging towards 0, 0. In the example shown, the plot points 464*a*-464*n* corresponding to the vehicle 30*c* may be clustered in a region of the graph 450 corresponding to an X,Y value of approximately 100,100 and converging towards 0, 0. In the example shown, the plot points 466*a*-466*n* corresponding to the vehicle 30*d* may be clustered in a region of the graph 450 corresponding to an X,Y value of approximately 75, −150 and converging towards 0, 0.

In the example shown, the potential positions may indicate 4 vehicles approaching a common location. However, the potential positions alone may not provide enough information to reliably make inferences. In an example, the ASIL classification for the vehicles 30*a*-30*n* may not be increased on the basis of the location parameter unless the data is determined to be reliable.

Figure 11:
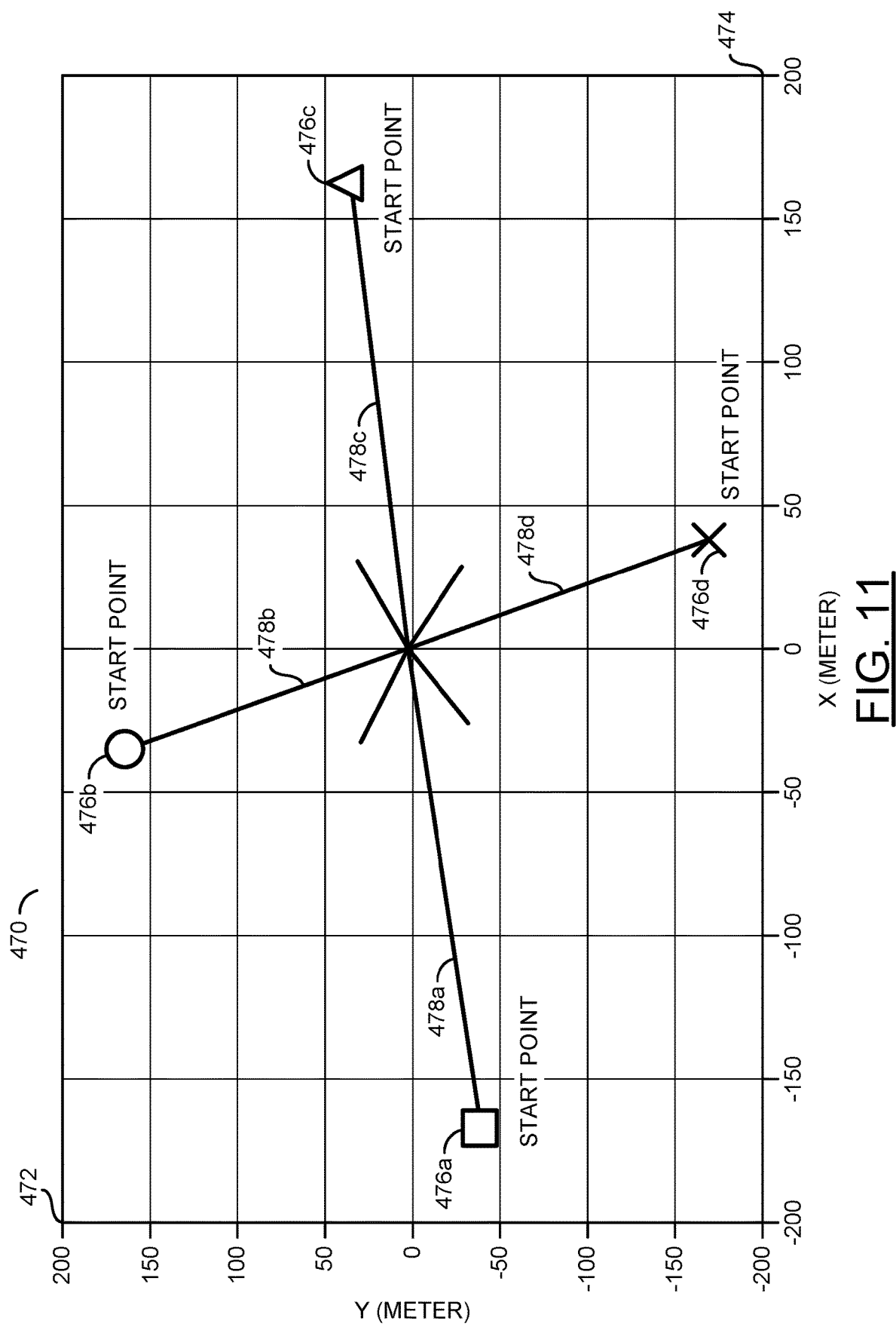
FIG. 11 is a diagram illustrating a determination of initial relative positions.

Referring to FIG. 11, a graph 470 illustrating a determination of initial relative positions is shown. The graph 470 may represent a start point and/or estimated direction of travel calculated by the modules 100*a*-100*n*. In the example graph 470, estimated initial relative positions from four of the vehicles 30*a*-30*n* are shown.

The graph 470 may comprise a Y-axis 472 and an X-axis 474. The Y-axis 472 may represent a distance range from −200 meters to 200 meters in one direction. The X-axis 474 may represent a distance range from −200 meters to 200 meters in a direction orthogonal to the direction of the Y-axis 472.

Start points 476*a*-476*d* are shown on the graph 470. The start points 476*a*-476*d* are each represented as a respective shape (e.g., a shape corresponding to the estimated pair-wise distance plot points 460*a*-460*n*, 462*a*-462*n*, 464*a*-464*n*, and/or 466*a*-466*n* shown in association with FIG. 10). In an example, the square shaped start point 476*a* may correspond to the vehicle 30*a*, the circle shaped start point 476*b* may correspond to the vehicle 30*b*, the triangle shaped start point 476*c* may correspond to the vehicle 30*c* and the X shaped start point 476*d* may correspond to the vehicle 30*d*.

Lines 478*a*-478*d* are shown on the graph 470. The lines 478*a*-478*d* may correspond to the start points 476*a*-476*d*. Each of the lines 478*a*-478*d* may represent a direction of travel from the corresponding start points 476*a*-476*d* of one of the vehicles 30*a*-30*d*. In one example, the line 478*a* may represent a direction of travel of the vehicle 30*a* from the start point 476*a*. Similarly, the line 478*b* may represent a direction of travel of the vehicle 30*b* from the start point 476*b*, the line 478*c* may represent a direction of travel of the vehicle 30*c* from the start point 476*c*, and the line 478*d* may represent a direction of travel of the vehicle 30*d* from the start point 476*d*. The location of the start points 476*a*-476*d* and/or the directions of travel 478*a*-478*d* may be varied according to the design criteria of a particular implementation and/or the traffic scenario.

The initial relative positions (e.g., the start points 476*a*-476*d*) may be determined by performing MDS calculations (e.g., scaling operations) on the estimated pair-wise distances 460*a*-460*n*, 462*a*-462*n*, 464*a*-464*n*, and/or 466*a*-466*n*. In an example, the MDS calculations may be performed by the relative positioning module 152 of the processor 124. By performing the MDS calculations on the estimated pair-wise distances 460*a*-460*n*, 462*a*-462*n*, 464*a*-464*n*, and/or 466*a*-466*n*, the start points 476*a*-476*d* and/or the direction of travel 478*a*-478*d* may be inferred on one coordinate system. The previous potential positions of the vehicles 30*a*-30*d* determined by the modules 100*a*-100*n* for other coordinate systems may be used to perform the procrustes analysis. Performing the MDS calculations and/or determining the previous positions of the vehicles 30*a*-30*d* (e.g., the start points 476*a*-476*d* and/or the direction of travel 478*a*-478*d*) may be one step of determining the relative positioning data 170*d*.

In the example shown, the X,Y coordinates of the start point 476*a* may be determined to be approximately −150, −50 and the direction of travel 478*a* may be approximately towards the point 0, 0. In the example shown, the X,Y coordinates of the start point 476*b* may be determined to be approximately −50,150 and the direction of travel 478*b* may be approximately towards the point 0,0. In the example shown, the X,Y coordinates of the start point 476*c* may be determined to be approximately 150,50 and the direction of travel 478c may be approximately towards the point 0, 0. In the example shown, the X,Y coordinates of the start point 476d may be determined to be approximately 50, −150 and the direction of travel 478d may be approximately towards the point 0, 0.

Generally, the location of the start points 476a-476d correspond to a clustering of the corresponding estimated pair-wise distance plot points 460a-460n, 462a-462n, 464a-464n, and/or 466a-466n shown in association with FIG. 10. Similarly, the direction of travel 478a-478d generally corresponds to where the estimated pair-wise distance plot points 460a-460n, 462a-462n, 464a-464n, and/or 466a-466n converge (e.g., at 0, 0) as shown in association with FIG. 10. In the example shown, the four vehicles 30a-30d may each be approaching a 4-way intersection from a different direction.

Figure 12:
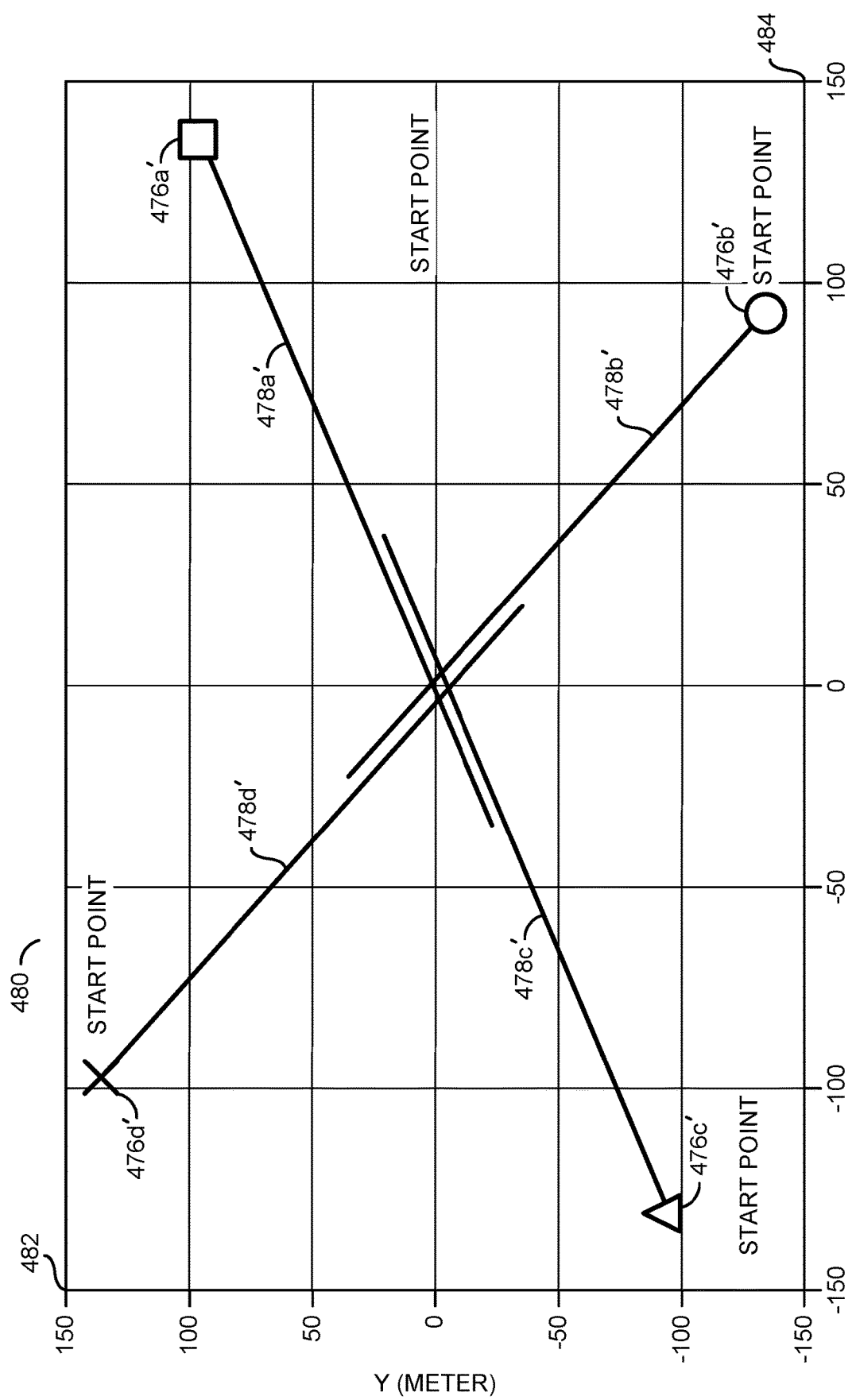
FIG. 12 is a diagram illustrating a determination of a procrustes position.

Referring to FIG. 12, a graph 480 illustrating a determination of a procrustes position is shown. The graph 480 may represent a start point and/or estimated direction of travel calculated by the modules 100a-100n on a corrected coordinate system. In the example graph 480, relative procrustes positions from four of the vehicles 30a-30n are shown.

The graph 480 may comprise a Y-axis 482 and an X-axis 484. The Y-axis 482 may represent a distance range from −150 meters to 150 meters in one direction. The X-axis 484 may represent a distance range from −150 meters to 150 meters in a direction orthogonal to the direction of the Y-axis 482.

Start points 476a'-476d' are shown on the graph 480. The start points 476a'-476d' are each represented as a respective shape (e.g., a shape corresponding to the estimated pair-wise distance plot points 460a-460n, 462a-462n, 464a-464n, and/or 466a-466n shown in association with FIG. 10). In an example, the square shaped start point 476a' may correspond to the vehicle 30a, the circle shaped start point 476b' may correspond to the vehicle 30b, the triangle shaped start point 476c' may correspond to the vehicle 30c and the X shaped start point 476d' may correspond to the vehicle 30d.

Lines 478a'-478d' are shown on the graph 480. The lines 478a'-478d' may correspond to the start points 476a'-476d'. Each of the lines 478a'-478d' may represent a travel path from the corresponding start points 476a'-476d' of one of the vehicles 30a-30d on the corrected coordinate system. In one example, the line 478a' may represent a travel path of the vehicle 30a from the start point 476a'. Similarly, the line 478b' may represent a travel path of the vehicle 30b from the start point 476b', the line 478c' may represent a travel path of the vehicle 30c from the start point 476c', and the line 478d' may represent a travel path of the vehicle 30d from the start point 476d'. The location of the start points 476a'-476d' and/or the travel paths 478a'-478d' may be varied according to the design criteria of a particular implementation and/or the traffic scenario.

The relative positions (e.g., the start points 476a'-476d') may be determined by performing the procrusting procedure on the initial positions 476a-476d and/or the directions of travel 478a-478d. In an example, the procrusting procedure may be performed by the relative positioning module 152 of the processor 124 on the MDS result. The procrusting procedure may comprise translation, scaling, rotation and/or mirroring (e.g., as described in association with FIGS. 5-8). The relative positioning module 152 may further apply dynamic and/or global optimizations to the result of the procrusting procedure. For example, filtering (e.g., Kalman filtering) using inputs from the results of the MDS calculation and/or procrusting procedure and/or other information from the vehicles 30a-30d (e.g., speed, gyro readings, etc.) may be used. By performing the procrusting procedure and/or other optimizations on the results of the MDS calculation, the relative positioning data 170d may be inferred on the corrected coordinate system. Performing the procrusting procedure and/or other optimizations on the results of the MDS calculations (e.g., the initial positions of the vehicles 30a-30d) may be one step of determining the relative positioning data 170d.

In the example shown, the X,Y coordinates of the start point 476a' may be determined to be approximately 150, 100 and the travel path 478a' may be approximately to the point 0, 0. In the example shown, the X,Y coordinates of the start point 476b' may be determined to be approximately 100, −150 and the travel path 478b' may be approximately to the point 0, 0. In the example shown, the X,Y coordinates of the start point 476c' may be determined to be approximately −150, −100 and the travel path 478c' may be approximately to the point 0, 0. In the example shown, the X,Y coordinates of the start point 476d' may be determined to be approximately −100, 150 and the travel path 478d' may be approximately to the point 0,0. In the example shown, the positions of the four vehicles 30a-30d may be translated to the corrected coordinate system and indicate traveling through the 4-way intersection.

Generally, the locations of the start points 476a'-476d' shown in the graph 480 (e.g., after the procrusting procedure) are different than the locations of the corresponding start points 476a-476d shown in the graph 470. The procrusting procedure may implement filtering, scaling, rotation, dilation and/or mirroring, to translate the initial positions 476a-476d to the translated positions 476a'-476d'. By translating the positions, the relative position module 152 may generate a common basis (e.g., the corrected coordinate system) for comparing sets of data generated by the MDS calculations. For example, as the host vehicle 30a moves around, the spatial relationship with the remote vehicles 30b-30d may be changed. The common basis for comparing data may provide a best fit approach to enable comparing an arrangement of data to similarly arranged data. In one example, after the procrusting procedure provides the common basis, and the relative positioning module 152 compares the similarly arranged data, if one of the data sets is not within an acceptable range (e.g., the sum of squared deviations is determined to be too large), the relative position data 170d may be incorrect and the data may be discarded.

Figure 13:
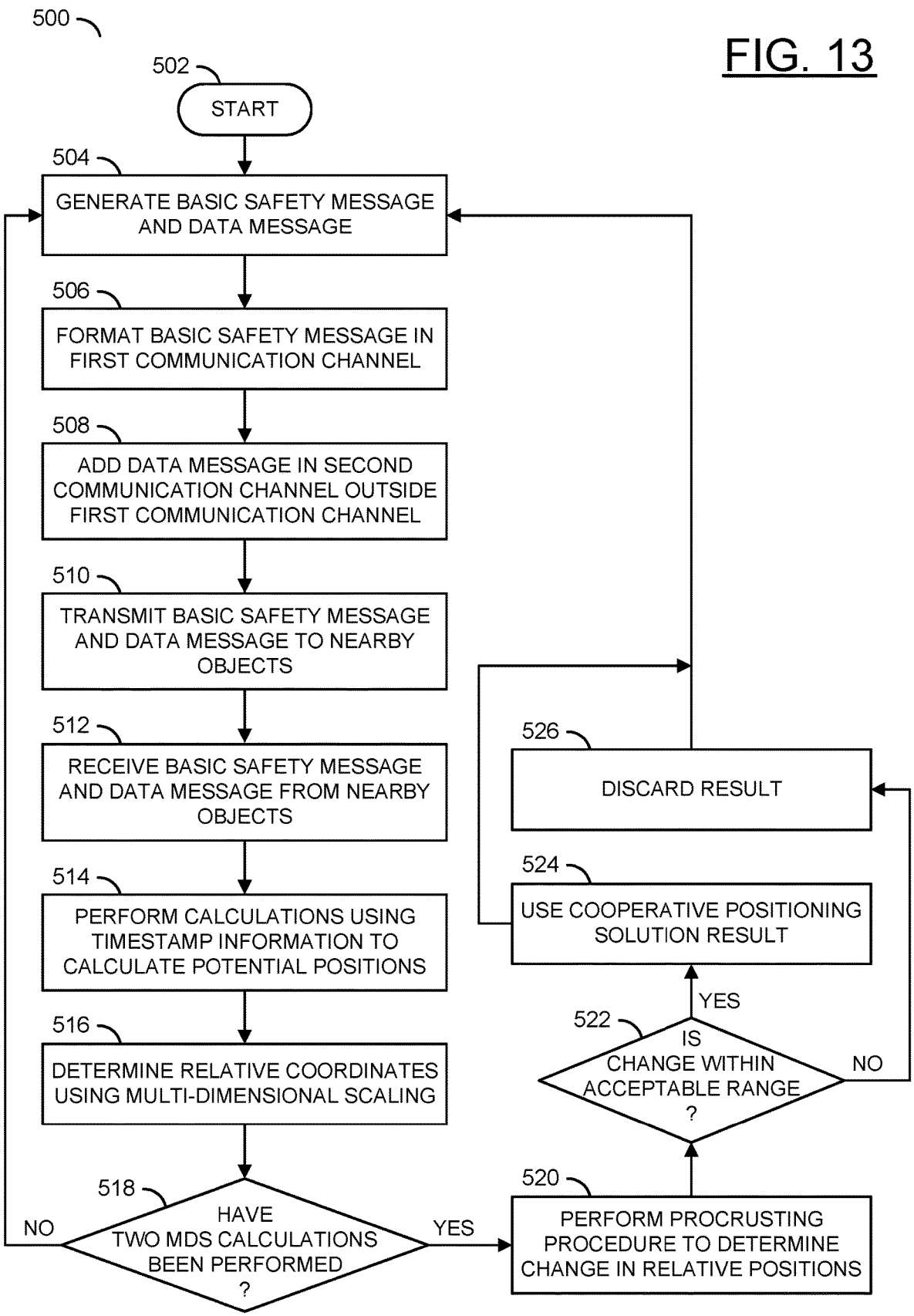
FIG. 13 is a flow diagram illustrating a method for determining a cooperative positioning solution.

Referring to FIG. 13, a method (or process) 500 is shown. The method 500 may determine a cooperative positioning solution. The method 500 generally comprises a step (or state) 502, a step (or state) 504, a step (or state) 506, a step (or state) 508, a step (or state) 510, a step (or state) 512, a step (or state) 514, a step (or state) 516, a decision step (or state) 518, a step (or state) 520, a decision step (or state) 522, a step (or state) 524, and a step (or state) 526.

The state 502 may start the method 500. In the state 504, the processor 124 may generate the basic safety message (e.g., BSM11-BSMNN) and/or the data messages (e.g., DM11-DMNN). Next, in the state 506, the transceiver 122 may format the basic safety message in the first communication channel 402. In the state 508, the transceiver 122 may add the data message in the second communication channel 404 (e.g., outside of the first communication channel 402 but part of the same transmission event). Next, in the state 510, the transceiver 122 may transmit the basic safety message and the data message to nearby objects (e.g., as the signals RAA-RNN). In the state 512, the transceiver 122 may receive basic safety messages and/or data messages from nearby objects (e.g., from the objects 30a-30n). Next, in the state 514, the relative positioning module 152 may perform calculations using time stamp information to calculate potential positions of the nearby objects 30a-30n. In the state 516, the relative positioning module 152 may determine relative coordinates using MDS calculations. Next, the method 500 may move to the decision state 518.

In the decision state 518, the relative positioning module 152 may determine whether there have been two MDS calculations performed. If not, the method 500 may return to the state 504. If two MDS calculations have been performed (e.g., two data sets are available), the method 500 may move to the state 520. In the state 520 the relative positioning module 152 may perform the procrusting procedure to determine changes in the relative positions of objects 30a-30n. Next, the method 500 may move to the decision state 522.

In the decision state 522, the relative positioning module 152 may determine whether the change is within an acceptable range. For example, after the initial convergence the remaining variation (e.g., between the estimated track and the new MDS result), may be less than 1 m. In another example, during initial MDS calculations (e.g., approximately five initial calculations) a large error may be expected but the amount of error should converge towards approximately 1 m of uncertainty. If the amount of change is within the acceptable range, the method 500 may move to the state 524. In the state 524, the relative positioning module 152 may use the cooperative positioning solution result (e.g., the values may be stored as the relative position data 170d). Next, the method 500 may return to the state 504. In the decision state 522, if the change is not within the acceptable range, the method 500 may move to the state 526. In the state 526, the relative positioning module 152 may discard the result. Next, the method 500 may return to the state 504.

Figure 14:
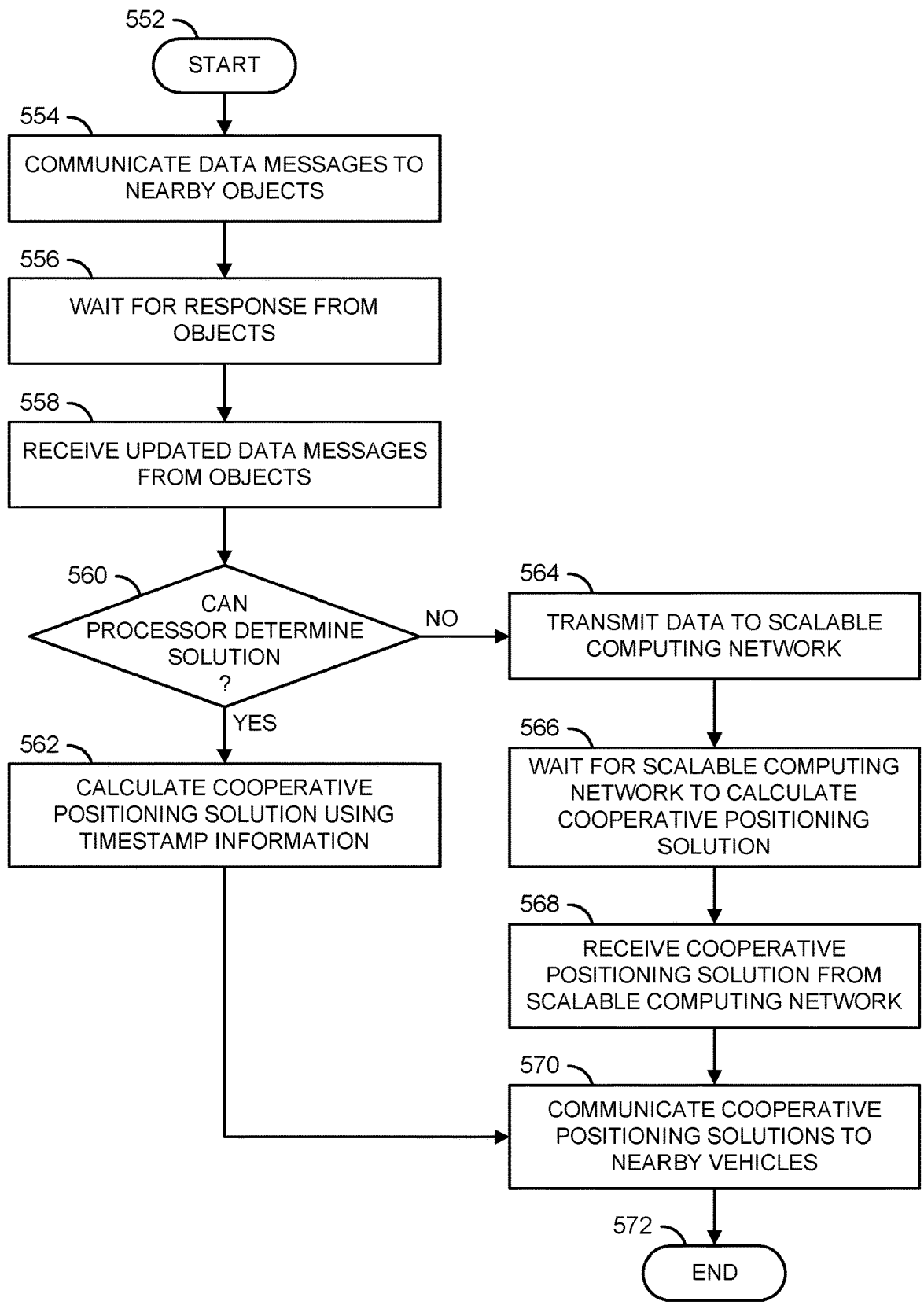
FIG. 14 is a flow diagram illustrating a method for receiving a cooperative positioning solution from a scalable computing network.

Referring to FIG. 14, a method (or process) 550 is shown. The method 550 may receive a cooperative positioning solution from the scalable computing network 302. The method 550 generally comprises a step (or state) 552, a step (or state) 554, a step (or state) 556, a step (or state) 558, a decision step (or state) 560, a step (or state) 562, a step (or state) 564, a step (or state) 566, a step (or state) 568, a step (or state) 570, and a step (or state) 572.

The state 552 may start the method 550. In the state 554, the transceiver 122 may communicate the data messages DM11-DMNN to the nearby objects 30a-30n. Next, in the state 552, the module 100 may wait for responses from the objects 30a-30n. In the state 558, the transceiver 122 may receive updated data messages DM11-DMNN from one or more of the objects 30a-30n. Next, the method 550 may move to the decision state 560.

In the decision state 560, the module 100 may determine whether the processor 124 is capable of determining the cooperative positioning solution. For example, whether the processor 124 is capable of determining the cooperative positioning solution may depend on an amount of processing capability available, a data transmission rate, an amount of power available to the module 100, an amount of time to determine the solution and/or an amount of data messages received. If the processor 124 can determine the solution, the method 550 may move to the state 562. In the state 562, the relative positioning module 152 may calculate the cooperative positioning solution using the time stamp information. Next, the method 550 may move to the state 570.

In the decision state 560, if the processor 124 cannot determine the solution, the method 550 may move to the state 564. In the state 564, the transceiver 122 may communicate the data to a scalable computing network 302 (e.g., a server computer and/or network of computing devices configured to provision resources based on demand). Next, in the state 566, the module 100 may wait for the scalable computing network 302 to calculate the cooperative positioning solution. In the state 568, the transceiver 122 may receive the cooperative positioning solution from the scalable computing network 302. Next, the method 550 may move to the state 570.

In the state 570, the transceiver 122 may communicate the cooperative positioning solution to nearby vehicles 30a-30n. Next, the method 550 may move to the state 572. The state 572 may end the method 550.

Figure 15:
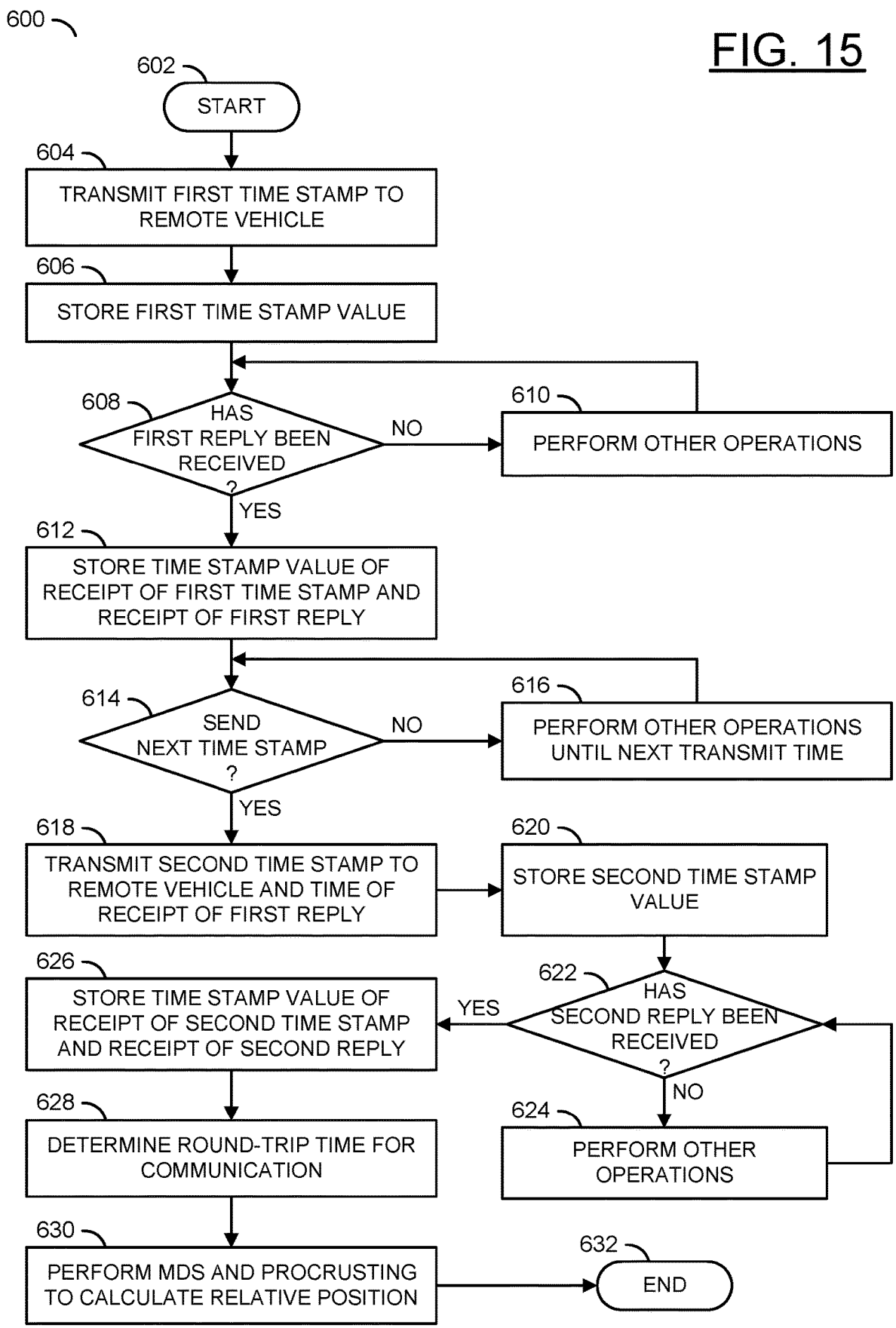
FIG. 15 is a flow diagram illustrating a method for transmitting time stamp values from a host vehicle for signal distance calculations.

Referring to FIG. 15, a method (or process) 600 is shown. The method 600 may transmit time stamp values from a host vehicle for signal distance calculations. The method 600 generally comprises a step (or state) 602, a step (or state) 604, a step (or state) 606, a decision step (or state) 608, a step (or state) 610, a step (or state) 612, a decision step (or state) 614, a step (or state) 616, a step (or state) 618, a step (or state) 620, a decision step (or state) 622, a step (or state) 624, a step (or state) 626, a step (or state) 628, a step (or state) 630, and a step (or state) 632.

The state 602 may start the method 600. Next, in the state 604, the transceiver 122 of the host vehicle 30a may transmit the first time stamp TIMESTAMP1A to the remote vehicle 30b. In the state 606, the memory 132 of the module 100a may store the first time stamp value TD1 in the time stamp/delay data 170c. Next, the method 600 may move to the decision state 608.

In the decision state 608, the module 100a may determine whether the first reply TIMESTAMP2A has been received from the module 100b of the remote vehicle 30b. If the first reply TIMESTAMP2A has not been received, the method 600 may move to the state 610. In the state 610, the module 100a may perform other operations (e.g., continue normal functionality while waiting for a reply). Next, the method 600 may return to the decision state 608. In the decision state 608, if the first reply TIMESTAMP2A has been received, the method 600 may move to the state 612. In the state 612, the memory 132 of the module 100a may store the time stamp value SA1 indicating the receipt of the first time stamp TIMESTAMP1A by the module 100b, the time stamp value SD1 of the time of transmission of the first reply TIMESTAMP2A (e.g., both provided in the signal TIMESTAMP2A) and the time of stamp value TA1 of the receipt of the first reply TIMESTAMP2A in the time stamp/delay data 170c. Next, the method 600 may move to the decision state 614.

In the decision state 614, the module 100a may determine whether to send the next time stamp. If not, the method 600 may move to the state 616. In the state 616, the module 100a may perform other operations until the next transmit time. For example, with a transmission rate of 10 Hz, time stamps may be transmitted at every 100 ms interval. Next, the method 600 may return to the decision state 614. In the decision state 614, if the module 100a determines to send the next time stamp, the method 600 may move to the state 618. In the state 618, the transceiver 122 of the host module 100a may transmit the second time stamp TIMESTAMP3A to the module 100b of the remote vehicle 30b. For example, the second time stamp TIMESTAMP3A may comprise the time stamp value TD2 (e.g., indicating the time of transmission of the signal TIMESTAMP3A) and/or the time stamp value TA1 (e.g., indicating the time of receipt of the first reply TIMESTAMP2A). Next, in the state 620, the memory 132 of the module 100*a* may store the second time stamp value TD2 in the time stamp/delay data 170*c*. Next, the method 600 may move to the decision state 622.

In the decision state 622, the module 100*a* may determine whether the second reply TIMESTAMP4A has been received. If not, the method 600 may move to the state 624. In the state 624, the module 100*a* may perform other operations. Next, the method 600 may return to the decision state 622. In the decision state 622, if the second reply TIMESTAMP4A has been received, the method 600 may move to the state 626.

In the state 626, the memory 132 of the module 100*a* may store the time stamp value SD2 of the receipt of the second time stamp TIMESTAMP3A by the remote module 100*b* (e.g., provided in the reply signal TIMESTAMP4A) and/or the time stamp value TA2 of the receipt of the second replay signal TIMESTAMP4A. Next, in the state 628, the relative positioning module 152 may determine the round-trip time (e.g., signal distance calculations) for the communication using one or more of the time stamp values TD1, TD2, TA1, TA2, SA1, SA2, SD1 and/or SD2. In the state 630, the relative positioning module 152 may perform the MDS calculations and/or procrusting procedure to calculate the relative position data 170*d*. Next, the method 600 may move to the state 632. The state 632 may end the method 600.

Figure 16:
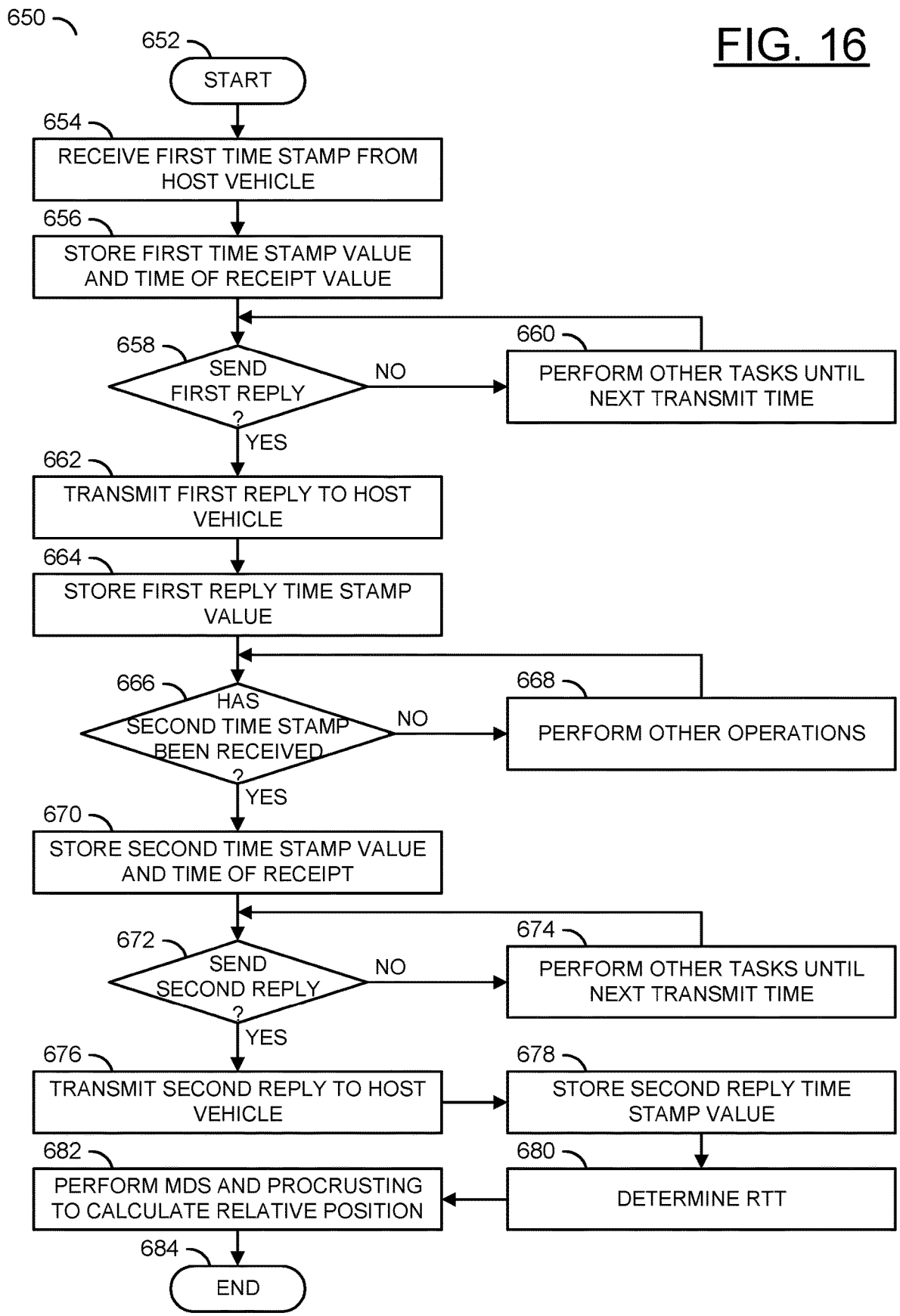
FIG. 16 is a flow diagram illustrating a method for a replying to time stamp values in response to received time stamp values.

Referring to FIG. 16, a method (or process) 650 is shown. The method 650 may reply to time stamp values in response to received time stamp values. The method 650 generally comprises a step (or state) 652, a step (or state) 654, a step (or state) 656, a decision step (or state) 658, a step (or state) 660, a step (or state) 662, a step (or state) 664, a decision step (or state) 666, a step (or state) 668, a step (or state) 670, a decision step (or state) 672, a step (or state) 674, a step (or state) 676, a step (or state) 678, a step (or state) 680, a step (or state) 682, and a step (or state) 684.

The state 652 may start the method 650. Next, in the state 654, the remote vehicle module 100*b* may receive the first time stamp TIMESTAMP1A from the host vehicle 30*a*. In the state 656, the memory 132 of the module 100*b* may store the first time stamp value TD1 (provided by the signal TIMESTAMP1A) and the time stamp value SA1 indicating the time of receipt of the signal TIMESTAMP1A by the module 100*b*. Next, the method 650 may move to the decision state 658.

In the decision state 658, the module 100*b* may determine whether to send the first reply TIMESTAMP2A. If not, the method 650 may move to the state 660. In the state 660, the module 100*b* may perform other tasks until the next transmit time (e.g., every 100 ms at a refresh rate of 10 Hz). Next, the method 650 may return to the decision state 658. In the decision state 658, if the module 100*b* determines to send the first reply, the method 650 may move to the state 662. In the state 662, the module 100*b* may append the time stamp value SA1 (e.g., indicating the time of receipt of the signal TIMESTAMP1A) and/or the time stamp value SD1 (e.g., indicating the time of transmission of the first reply signal TIMESTAMP2A) to the first reply and transmit the first reply signal TIMESTAMP2A to the module 100*a* of the host vehicle 30*a*. Next, in the state 664, the memory 132 of the module 100*b* may store the time stamp value SD1 of the time of transmission of the first reply TIMESTAMP2A. Next, the method 650 may move to the decision state 666.

In the decision state 666, the module 100*b* may determine whether the second time stamp TIMESTAMP3A has been received from the module 100*a* of the host vehicle 30*a*. If not, the method 650 may move to the state 668. In the state 668, the module 100*b* may perform other operations (e.g., perform normal functionality while waiting for the next time stamp). Next, the method 650 may return to the decision state 666. In the decision state 666, if the second time stamp TIMESTAMP3A has been received, the method 650 may move to the state 670. In the state 670, the memory 132 of the module 100*b* of the remote vehicle 30*b* may store the second time stamp value TD2 (e.g., indicating the time of transmission of the signal TIMESTAMP3A) and the time stamp value SA2 (e.g., indicating the time of arrival of the signal TIMESTAMP3A) in the time stamp/delay data 170*c*. Next, the method 650 may move to the decision state 672.

In the decision state 672, the module 100*b* may determine whether to send the second reply TIMESTAMP4A. If not, the method 650 may move to the state 674. In the state 674, the module 100*b* may perform other tasks until the next transmission time. Next, the method 650 may return to the decision state 672. In the decision state 672, if the module 100*b* determines to send the next reply to the module 100*a*, the method 650 may move to the state 676.

In the state 676, the transceiver 122 of the module 100*b* may transmit the second reply signal TIMESTAMP4A (e.g., comprising the time stamp value SA2 and/or the time stamp value SD2) to the module 100*a* of the host vehicle 30*a*. Next, in the state 678, the memory 132 of the module 100*b* may store the second time stamp reply value SD2 in the time stamp/delay data 170*c*. In the state 680, the relative positioning module 152 of the module 100*b* may determine the round-trip time of the communication using the time stamp values TD1, TD2, TA1, SA1, SA2, SD1 and/or SD2. Next, in the state 682, the relative positioning module 152 may perform the MDS calculation and/or procrusting procedure to calculate the relative position data 170*d*. Next, the method 650 may move to the state 684. The state 684 may end the method 650.

Figure 17:
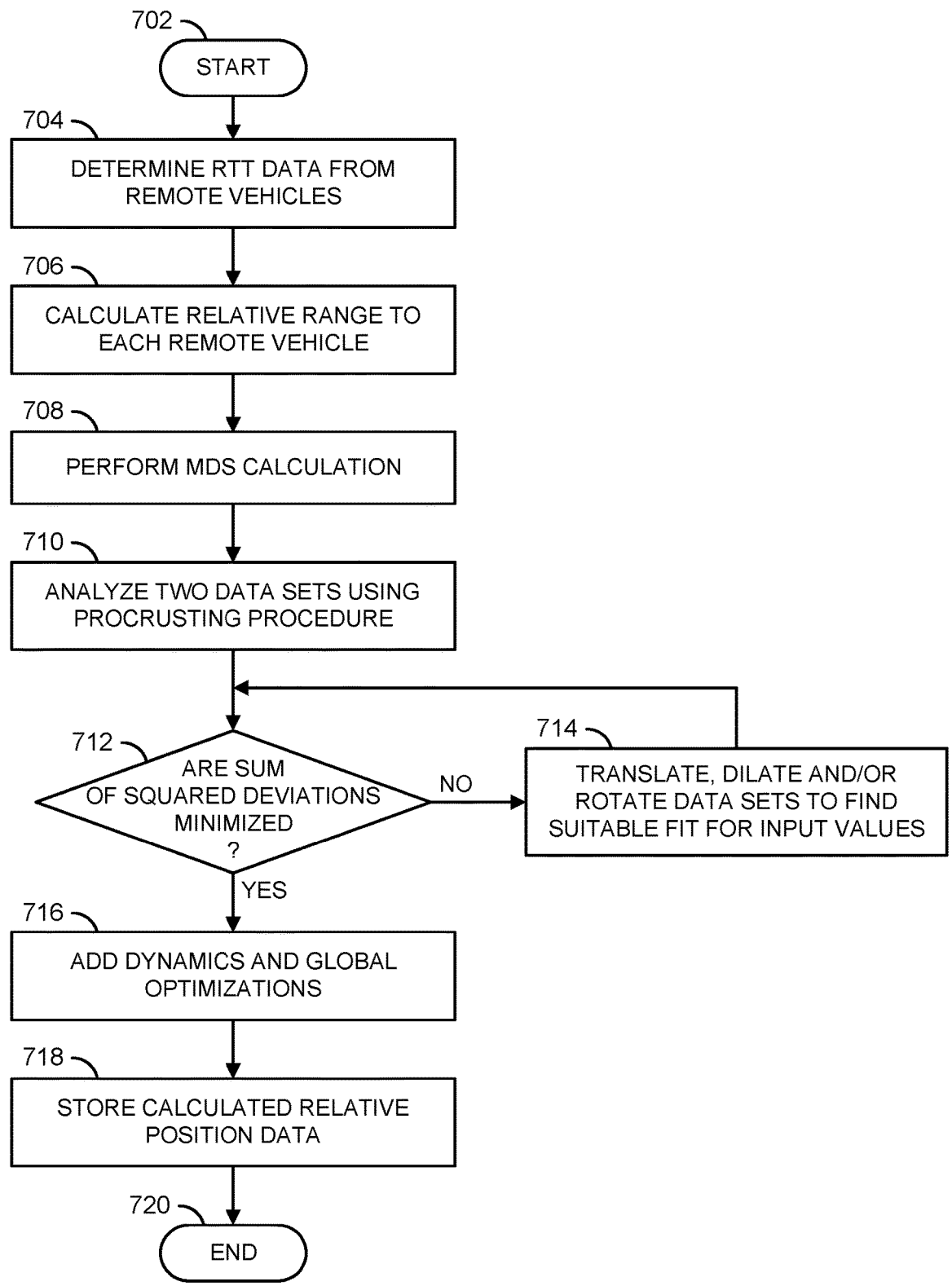
FIG. 17 is a flow diagram illustrating a method for calculating relative position coordinates using a procrusting procedure.

Referring to FIG. 17, a method (or process) 700 is shown. The method 700 may calculate relative position coordinates using the procrusting procedure. The method 700 generally comprises a step (or state) 702, a step (or state) 704, a step (or state) 706, a step (or state) 708, a step (or state) 710, a decision step (or state) 712, a step (or state) 714, a step (or state) 716, a step (or state) 718, and a step (or state) 720.

The state 702 may start the method 700. In the state 704, the relative positioning module 152 may determine the RTT data (e.g., signal distance calculations) using the time stamp values received from one or more of the remote vehicles 30*b*-30*n*. Next, in the state 706, the relative positioning module 152 may calculate the relative range to each of the remote vehicles 30*b*-30*n*. In the state 708, the relative positioning module 152 may perform the MDS calculations. In the state 710, the relative position module 152 may analyze two data sets using the procrusting procedure. Next, the method 700 may move to the decision state 712.

In the decision state 712, the relative position module 152 may determine whether the sum of squared deviations are minimized. For example, the relative position module 152 may determine whether the sum of squared deviations are within an acceptable range. If not, the method 700 may move to the state 714. In the state 714, the relative position module 152 may translate, dilate and/or rotate the data sets to find a suitable fit for the input values. In an example, the relative position module 152 may find the optimal size of a 'triangle' that fits the other input values to enable a comparison of the data sets using the corrected coordinate system. Next, the method 700 may return to the decision state 712. In the decision state 712, if the sum of squared deviations are acceptable, the method 700 may move to the state 716.

In the state 716, the relative position module 152 may add dynamics and/or global optimizations to the results of the procrusting procedure. In an example, filtering may be performed on the results by the Kalman filter 128. In another example, other inputs may be used such as previously calculated positions, vehicle dynamics and/or radios providing positional information. Next, in the state 718, the memory 132 may store the calculated relative position data 170d. Next, the method 700 may move to the state 720. The state 720 may end the method 700.

The functions performed by the diagrams of FIGS. 13-17 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a transceiver configured to communicate signals comprising (i) a standard message in a first channel and (ii) data messages in a second channel with a plurality of vehicles;
a processor configured to execute instructions; and
a memory configured to store instructions that, when executed, perform the steps of (A) generating signal distance calculations between said apparatus and at least three of said vehicles using said data messages, (B) calculating a plurality of potential positions of said vehicles using said signal distance calculations, (C) performing a scaling operation on said plurality of potential positions of said vehicles to determine relative positions of said vehicles on a coordinate system, (D) implementing a procrusting procedure on said coordinate system to generate a corrected coordinate system and (F) determining changes of said relative positions using said corrected coordinate system, wherein (i) said standard message comprises a GNSS location and status information according to a protocol, (ii) said data messages enable said relative positions to be calculated with a higher accuracy than said GNSS location and (iii) communicating said data messages in said second channel enables said data messages to be sent outside of said protocol during a single transmission event that includes said standard message.

2. The apparatus according to claim 1, wherein said changes represent an amount of error between sampled locations.

3. The apparatus according to claim 1, wherein said said standard message is an A la Carte Message.

4. The apparatus according to claim 1, wherein said standard message is a Basic Safety Message.

5. The apparatus according to claim 1, wherein said data messages and said standard message implement a dedicated short range communication operating at approximately 5.9 GHz.

6. The apparatus according to claim 1, wherein said scaling operation implements Multi-Dimensional Scaling (MDS).

7. The apparatus according to claim 1, wherein said procrusting procedure comprises a translation calculation, a rotation calculation and a dilation calculation.

8. The apparatus according to claim 1, wherein said data messages comprise time stamp information.

9. The apparatus according to claim 8, wherein said time stamp information comprises four time stamps for each of said plurality of vehicles that said transceiver communicates with.

10. The apparatus according to claim 8, wherein (a) said time stamp information is used to determine said signal distance calculations and (b) said signal distance calculations comprise at least one of (i) a round-trip time calculation and (ii) a time of flight calculation.

11. The apparatus according to claim 8, wherein two of said data messages comprising said time stamp information are transmitted by a host vehicle to a remote vehicle and two of said data messages comprising said time stamp information are transmitted by said remote vehicle to said host vehicle as a reply to said data messages transmitted by said host vehicle.

12. The apparatus according to claim 1, wherein (i) each of said plurality of vehicles implement a respective one of said apparatuses and (ii) said transceiver communicates with respective transceivers of said respective apparatuses to communicate said data messages.

13. The apparatus according to claim 1, wherein (i) said transceiver is configured to communicate said data messages to a scalable computing network, (ii) said scalable computing network is configured to (a) use said data messages to determine a cooperative positioning solution and (b) communicate said cooperative positioning solution to said apparatus and (iii) said apparatus is configured to communicate said cooperative positioning solution to said plurality of vehicles.

14. The apparatus according to claim 13, wherein said processor is configured to fuse said cooperative positioning solution with sensor data received from a plurality of sensors implemented on said plurality of vehicles to make inferences about an environment near said plurality of vehicles.

15. The apparatus according to claim 13, wherein said processor is configured to use said cooperative positioning solution with map information in order to provide navigation information.

16. The apparatus according to claim 1, wherein said GNSS location provides a longitude and latitude measurement accurate within 1.5 meters and said relative positions are calculated with said higher accuracy that is better than said 1.5 meters.

17. The apparatus according to claim 1, wherein said standard message comprises core data according to said protocol and situational data for particular situations according to said protocol.

18. The apparatus according to claim 1, wherein said status information comprises one or more of a vehicle speed, a vehicle size, a heading measurement, an acceleration measurement, a transmission state, a steering wheel angle, brake status, traction control status and anti-lock brake status.

19. The apparatus according to claim 1, wherein said processor is configured to discard said relative positions in response to determining that said relative positions have an error greater than an acceptable amount of error.

* * * * *